United States Patent
Naik et al.

(10) Patent No.: US 11,766,957 B2
(45) Date of Patent: Sep. 26, 2023

(54) RELEASE MECHANISM FOR SEAT RECLINER ASSEMBLY

(71) Applicant: Fisher & Company, Incorporated, St. Clair Shores, MI (US)

(72) Inventors: Firoz Divan Naik, Harrison Charter Township, MI (US); Sapan Mahendra Poptani, Northville, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 121 days.

(21) Appl. No.: 17/586,203

(22) Filed: Jan. 27, 2022

(65) Prior Publication Data

US 2022/0258651 A1 Aug. 18, 2022

Related U.S. Application Data

(60) Provisional application No. 63/149,799, filed on Feb. 16, 2021.

(51) Int. Cl.
*B60N 2/02* (2006.01)
*B60N 2/235* (2006.01)
*B60N 2/20* (2006.01)

(52) U.S. Cl.
CPC .......... *B60N 2/0232* (2013.01); *B60N 2/20* (2013.01); *B60N 2/2356* (2013.01); *B60N 2205/50* (2013.01)

(58) Field of Classification Search
CPC ...... B60N 2/0232; B60N 2/20; B60N 2/2356; B60N 2/225; B60N 2205/50; B60N 2002/024

(Continued)

(56) References Cited

U.S. PATENT DOCUMENTS

| 3,736,026 A | 5/1973 | Ziegler et al. |
| 3,953,069 A | 4/1976 | Tamura et al. |

(Continued)

FOREIGN PATENT DOCUMENTS

| CA | 2369034 A1 | 7/2002 |
| CA | 2759299 A1 | 12/2011 |

(Continued)

OTHER PUBLICATIONS

Office Action regarding Chinese Patent Application No. 202010305091.5, dated Jan. 27, 2022. Translation provided by Unitalen Attorneys at Law.

(Continued)

*Primary Examiner* — Mark R Wendell
(74) *Attorney, Agent, or Firm* — Harness, Dickey & Pierce, P.L.C.

(57) ABSTRACT

A seatback adjustment assembly may include a recliner heart, an attachment plate, and a lever. The recliner heart is operable in an unlocked state permitting relative rotation between a seatback and a seat bottom and a locked state preventing relative rotation between the seatback and the seat bottom. The attachment plate is rotationally fixed to the recliner heart. The lever is rotatable between a first state in which the lever is engaged with the attachment plate and a second state in which the lever is disengaged from the attachment plate. When lever is in the first state and the recliner heart is in the unlocked state, rotation of the recliner heart causes corresponding rotation of the seatback relative to the seat bottom. However, the seatback is configured to rotate relative to the seat bottom without causing corresponding rotation of the recliner heart when the lever is in the second state.

20 Claims, 14 Drawing Sheets

(58) Field of Classification Search
USPC .................................................. 297/362.11
See application file for complete search history.

(56) References Cited

U.S. PATENT DOCUMENTS

| | | |
|---|---|---|
| 4,219,234 A | 8/1980 | Bell |
| 4,243,264 A | 1/1981 | Bell |
| 4,279,442 A | 7/1981 | Bell |
| 4,372,610 A | 2/1983 | Fisher, III et al. |
| 4,457,557 A | 7/1984 | Une |
| 4,484,779 A | 11/1984 | Suzuki |
| 4,579,387 A | 4/1986 | Bell |
| 4,634,182 A | 1/1987 | Tanaka |
| 4,684,174 A | 8/1987 | Bell |
| 4,705,319 A | 11/1987 | Bell |
| 4,720,145 A | 1/1988 | Bell |
| 4,733,912 A | 3/1988 | Secord |
| 4,747,641 A | 5/1988 | Bell |
| 4,795,213 A | 1/1989 | Bell |
| 4,822,100 A | 4/1989 | Bell |
| 4,919,482 A | 4/1990 | Landis et al. |
| 4,928,374 A | 5/1990 | Allen |
| 5,007,680 A | 4/1991 | Miyauchi et al. |
| 5,044,647 A | 9/1991 | Patterson |
| 5,154,476 A | 10/1992 | Haider et al. |
| 5,240,309 A | 8/1993 | Kojer |
| 5,248,184 A | 9/1993 | Morris |
| 5,265,937 A | 11/1993 | Allen |
| 5,393,116 A | 2/1995 | Bolsworth et al. |
| 5,419,616 A | 5/1995 | Paetzold |
| 5,435,624 A | 7/1995 | Bray et al. |
| 5,460,429 A | 10/1995 | Whalen |
| 5,489,141 A | 2/1996 | Strausbaugh et al. |
| 5,577,805 A | 11/1996 | Glinter et al. |
| 5,590,932 A | 1/1997 | Olivieri |
| 5,622,410 A | 4/1997 | Robinson |
| 5,628,215 A | 5/1997 | Brown |
| 5,660,440 A | 8/1997 | Pejathaya |
| 5,718,481 A | 2/1998 | Robinson |
| 5,769,493 A | 6/1998 | Pejathaya |
| 5,788,330 A | 8/1998 | Ryan |
| 5,813,724 A | 9/1998 | Matsuura et al. |
| 5,823,622 A | 10/1998 | Fisher, IV et al. |
| 5,857,659 A | 1/1999 | Kato et al. |
| 5,918,939 A | 7/1999 | Magadanz |
| 5,927,809 A | 7/1999 | Tame |
| 5,941,591 A | 8/1999 | Tsuge et al. |
| 5,947,560 A | 9/1999 | Chen |
| 5,979,986 A | 11/1999 | Pejathaya |
| 6,007,152 A | 12/1999 | Kojima et al. |
| 6,023,994 A | 2/2000 | Yoshida |
| 6,047,444 A | 4/2000 | Braun |
| 6,068,341 A | 5/2000 | Rink |
| 6,074,009 A | 6/2000 | Farino |
| 6,095,609 A | 8/2000 | Magadanz |
| 6,106,067 A | 8/2000 | Zhuang et al. |
| 6,123,380 A | 9/2000 | Sturt et al. |
| 6,139,104 A | 10/2000 | Brewer |
| 6,158,800 A | 12/2000 | Tsuge et al. |
| 6,161,899 A | 12/2000 | Yu |
| 6,199,953 B1 | 3/2001 | Chen |
| 6,250,704 B1 | 6/2001 | Garrido |
| 6,290,297 B1 | 9/2001 | Yu |
| 6,328,381 B1 | 12/2001 | Smuk |
| 6,345,867 B1 | 2/2002 | Hellrung et al. |
| 6,447,066 B1 | 9/2002 | Chabanne et al. |
| 6,511,129 B1 | 1/2003 | Minor et al. |
| 6,533,357 B2 | 3/2003 | Pospeshil et al. |
| 6,550,864 B1 | 4/2003 | Zarna et al. |
| 6,554,362 B2 | 4/2003 | Pospeshil |
| 6,634,713 B2 | 10/2003 | Nonomiya et al. |
| 6,669,296 B2 | 12/2003 | Moriyama et al. |
| 6,669,299 B2 | 12/2003 | Carlson et al. |
| 6,698,837 B2 | 3/2004 | Pejathaya et al. |
| 6,709,053 B1 | 3/2004 | Humer et al. |
| 6,740,845 B2 | 5/2004 | Stol et al. |
| 6,758,525 B2 | 7/2004 | Uramichi |
| 6,854,802 B2 | 2/2005 | Matsuura et al. |
| 6,857,703 B2 | 2/2005 | Bonk |
| 6,860,562 B2 | 3/2005 | Bonk |
| 6,869,143 B2 | 3/2005 | Secord |
| 6,908,156 B1 | 6/2005 | Park et al. |
| 7,025,422 B2 | 4/2006 | Fast |
| 7,093,901 B2 | 8/2006 | Yamada |
| 7,097,253 B2 | 8/2006 | Coughlin et al. |
| 7,100,987 B2 | 9/2006 | Volker et al. |
| 7,121,624 B2 | 10/2006 | Pejathaya et al. |
| 7,152,924 B1 | 12/2006 | Nemoto et al. |
| 7,154,065 B2 | 12/2006 | Martukanitz et al. |
| 7,172,253 B2 | 2/2007 | Haverkamp |
| 7,198,330 B2 | 4/2007 | Wahlen et al. |
| 7,293,838 B2 | 11/2007 | Sugama et al. |
| 7,296,857 B2 | 11/2007 | Shinozaki et al. |
| 7,300,109 B2 | 11/2007 | Hofmann et al. |
| 7,306,286 B2 | 12/2007 | Syrowik et al. |
| 7,328,954 B2 | 2/2008 | Sasaki et al. |
| 7,360,838 B2 | 4/2008 | Smuk |
| 7,419,217 B2 | 9/2008 | Ishizuka |
| 7,458,639 B2 | 12/2008 | Thiel et al. |
| 7,490,907 B2 | 2/2009 | Nagura et al. |
| 7,500,719 B2 | 3/2009 | Kojima |
| 7,503,099 B2 | 3/2009 | Pejathaya |
| 7,527,336 B2 | 5/2009 | Kienke et al. |
| 7,578,556 B2 | 8/2009 | Ohba et al. |
| 7,604,297 B2 | 10/2009 | Weber |
| 7,695,068 B2 * | 4/2010 | Maeda ................ B60N 2/0232 297/362.11 |
| 7,775,591 B2 | 8/2010 | Hahn et al. |
| 7,775,594 B2 | 8/2010 | Bruck et al. |
| 7,976,103 B2 | 7/2011 | Gamache et al. |
| 8,052,215 B2 | 11/2011 | Ito |
| 8,128,169 B2 | 3/2012 | Narita et al. |
| 8,360,527 B2 | 1/2013 | Lehmann |
| 8,430,454 B2 | 4/2013 | Tanguy et al. |
| 8,449,034 B2 | 5/2013 | Tame et al. |
| 8,845,019 B2 | 9/2014 | Sawada |
| 8,985,690 B2 | 3/2015 | Yamada et al. |
| 9,102,248 B2 | 8/2015 | Matt |
| 9,108,541 B2 | 8/2015 | Assmann et al. |
| 9,221,364 B2 | 12/2015 | Nock et al. |
| 9,227,532 B2 | 1/2016 | Balzar et al. |
| 9,296,315 B2 | 3/2016 | Hellrung |
| 9,475,409 B2 | 10/2016 | Jiang et al. |
| 9,527,410 B2 | 12/2016 | Leconte |
| 9,527,419 B2 | 12/2016 | Hosbach et al. |
| 9,555,725 B2 | 1/2017 | Rothstein et al. |
| 9,573,493 B2 | 2/2017 | Nagura et al. |
| 9,616,779 B2 | 4/2017 | Barzen et al. |
| 9,623,774 B2 | 4/2017 | Yamada et al. |
| 9,701,222 B2 | 7/2017 | Kitou |
| 9,751,432 B2 | 9/2017 | Assmann |
| 9,873,357 B1 | 1/2018 | McCulloch et al. |
| 9,889,774 B2 | 2/2018 | Espinosa et al. |
| 10,065,538 B2 | 9/2018 | Desquesne et al. |
| 10,150,387 B2 | 12/2018 | Hiemstra et al. |
| 10,279,709 B2 | 5/2019 | Suzuki et al. |
| 10,399,466 B2 | 9/2019 | Chang |
| 10,610,018 B1 | 4/2020 | Madhu |
| 10,787,098 B2 | 9/2020 | Smuk |
| 10,800,296 B2 | 10/2020 | Schmitz et al. |
| 10,864,830 B2 | 12/2020 | Schmitz et al. |
| 11,052,797 B2 | 7/2021 | Poptani et al. |
| 2002/0043852 A1 | 4/2002 | Uramichi |
| 2003/0127898 A1 | 7/2003 | Niimi et al. |
| 2003/0178879 A1 | 9/2003 | Uramichi |
| 2003/0230923 A1 | 12/2003 | Uramichi |
| 2004/0134055 A1 | 7/2004 | Aizaki |
| 2004/0145226 A1 | 7/2004 | Bonk |
| 2004/0195889 A1 | 10/2004 | Secord |
| 2005/0029806 A1 | 2/2005 | Yamanashi et al. |
| 2005/0253439 A1 | 11/2005 | Sasaki et al. |
| 2006/0006718 A1 | 1/2006 | Umezaki |
| 2006/0012232 A1 | 1/2006 | Coughlin et al. |
| 2006/0055223 A1 | 3/2006 | Thiel et al. |

(56) References Cited

U.S. PATENT DOCUMENTS

| | | |
|---|---|---|
| 2006/0170269 A1 | 8/2006 | Oki |
| 2007/0138854 A1 | 6/2007 | Paing et al. |
| 2007/0145800 A1 | 6/2007 | Thiel et al. |
| 2007/0200408 A1 | 8/2007 | Ohta et al. |
| 2008/0001458 A1 | 1/2008 | Hoshihara et al. |
| 2008/0164741 A1 | 7/2008 | Sakamoto |
| 2009/0001797 A1 | 1/2009 | Neumann |
| 2009/0056124 A1 | 3/2009 | Krebs et al. |
| 2009/0072602 A1 | 3/2009 | Schuler |
| 2010/0072802 A1 | 3/2010 | Smith et al. |
| 2010/0096892 A1 | 4/2010 | Meghira et al. |
| 2010/0096896 A1 | 4/2010 | Nonomiya |
| 2010/0176621 A1 | 7/2010 | Aufrere et al. |
| 2010/0231021 A1 | 9/2010 | Myers et al. |
| 2010/0283304 A1 | 11/2010 | Thiel |
| 2010/0308634 A1 | 12/2010 | Narita et al. |
| 2010/0308635 A1 | 12/2010 | Tame et al. |
| 2010/0320823 A1 | 12/2010 | Thiel |
| 2011/0068612 A1 | 3/2011 | Thiel |
| 2011/0127814 A1 | 6/2011 | Thiel |
| 2011/0169314 A1 | 7/2011 | Tanguy et al. |
| 2011/0227386 A1 | 9/2011 | Berndtson et al. |
| 2011/0309665 A1 | 12/2011 | Leighton et al. |
| 2012/0086253 A1 | 4/2012 | Nock et al. |
| 2012/0169102 A1 | 7/2012 | Hiemstra et al. |
| 2012/0248841 A1* | 10/2012 | Hellrung ............... B60N 2/22 |
| | | 297/354.1 |
| 2012/0313415 A1 | 12/2012 | Nonomiya et al. |
| 2013/0161995 A1 | 6/2013 | Yamada et al. |
| 2013/0207434 A1 | 8/2013 | Stilleke et al. |
| 2013/0270884 A1 | 10/2013 | Espinosa et al. |
| 2014/0001806 A1 | 1/2014 | Golarz |
| 2014/0008956 A1 | 1/2014 | Golarz et al. |
| 2014/0008958 A1 | 1/2014 | Ito |
| 2014/0091607 A1 | 4/2014 | Maeda |
| 2014/0138998 A1 | 5/2014 | Christoffel et al. |
| 2014/0159458 A1 | 6/2014 | Lu et al. |
| 2014/0225411 A1 | 8/2014 | Matt |
| 2014/0239691 A1 | 8/2014 | Hellrung |
| 2014/0301682 A1 | 10/2014 | Leppla |
| 2015/0015044 A1 | 1/2015 | Teufel et al. |
| 2015/0042133 A1 | 2/2015 | Munemura et al. |
| 2015/0069809 A1 | 3/2015 | Matt |
| 2015/0091346 A1 | 4/2015 | Kitou |
| 2015/0091354 A1 | 4/2015 | Enokijima et al. |
| 2015/0123444 A1 | 5/2015 | Assmann |
| 2015/0266398 A1 | 9/2015 | Higashi et al. |
| 2015/0306986 A1 | 10/2015 | Jarry et al. |
| 2015/0321585 A1 | 11/2015 | McCulloch et al. |
| 2016/0023577 A1 | 1/2016 | Yamada et al. |
| 2016/0107546 A1 | 4/2016 | Barzen et al. |
| 2016/0272089 A1 | 9/2016 | Kim et al. |
| 2016/0339810 A1 | 11/2016 | Pluta et al. |
| 2017/0021743 A1 | 1/2017 | Hiemstra et al. |
| 2017/0037945 A1 | 2/2017 | Maeda et al. |
| 2017/0080828 A1 | 3/2017 | Aktas |
| 2017/0088021 A1 | 3/2017 | Noguchi et al. |
| 2017/0136921 A1 | 5/2017 | Dill et al. |
| 2017/0253152 A1 | 9/2017 | Maeda et al. |
| 2018/0043800 A1 | 2/2018 | Maeda et al. |
| 2018/0056819 A1 | 3/2018 | Schmitz et al. |
| 2018/0103760 A1 | 4/2018 | Fujita et al. |
| 2018/0154802 A1 | 6/2018 | Ito |
| 2018/0208087 A1 | 7/2018 | Baba et al. |
| 2018/0339613 A1 | 11/2018 | Mizobata |
| 2019/0255979 A1 | 8/2019 | Zahn et al. |
| 2019/0299821 A1 | 10/2019 | Maeda et al. |
| 2019/0329674 A1 | 10/2019 | Schmitz et al. |
| 2019/0337424 A1 | 11/2019 | Chang |
| 2019/0358694 A1 | 11/2019 | Yamakita |
| 2020/0047644 A1 | 2/2020 | Schmitz et al. |
| 2020/0070689 A1 | 3/2020 | Naik et al. |
| 2020/0164775 A1 | 5/2020 | Chang |
| 2020/0253380 A1 | 8/2020 | Schmitz et al. |
| 2020/0282879 A1* | 9/2020 | Schmitz ................ B60N 2/236 |
| 2020/0331367 A1* | 10/2020 | Schmitz ............... B60N 2/2213 |
| 2021/0039528 A1* | 2/2021 | Poptani ................ B60N 2/2356 |
| 2021/0061139 A1* | 3/2021 | Schmitz .................... B60N 2/20 |
| 2021/0276461 A1* | 9/2021 | Schmitz ............... B60N 2/2356 |

FOREIGN PATENT DOCUMENTS

| | | |
|---|---|---|
| CA | 2869816 A1 | 10/2013 |
| CN | 1291566 A | 4/2001 |
| CN | 1457306 A | 11/2003 |
| CN | 1840382 A | 10/2006 |
| CN | 101148152 A | 3/2008 |
| CN | 101616820 A | 12/2009 |
| CN | 101925485 A | 12/2010 |
| CN | 102126451 A | 7/2011 |
| CN | 102131673 A | 7/2011 |
| CN | 202086037 U | 12/2011 |
| CN | 102442228 A | 5/2012 |
| CN | 103025568 A | 4/2013 |
| CN | 103298652 A | 9/2013 |
| CN | 203228664 U | 10/2013 |
| CN | 203381519 U | 1/2014 |
| CN | 103702860 A | 4/2014 |
| CN | 103857314 A | 6/2014 |
| CN | 203974603 U | 12/2014 |
| CN | 105189196 A | 12/2015 |
| CN | 205097989 U | 3/2016 |
| CN | 205130981 U | 4/2016 |
| CN | 106799978 A | 6/2017 |
| CN | 107364369 A | 11/2017 |
| CN | 107428269 A | 12/2017 |
| CN | 107972542 A | 5/2018 |
| CN | 207291755 U | 5/2018 |
| CN | 108263253 A | 7/2018 |
| CN | 109515263 A | 3/2019 |
| CN | 109562707 A | 4/2019 |
| CN | 112339625 A | 2/2021 |
| DE | 907608 C | 3/1954 |
| DE | 1098292 B | 1/1961 |
| DE | 4324734 A1 | 1/1995 |
| DE | 20220200 U1 | 2/2004 |
| DE | 102007002366 B3 | 7/2008 |
| DE | 102008026176 A1 | 12/2009 |
| DE | 102008029438 A1 | 12/2009 |
| DE | 102010038795 A1 | 2/2012 |
| DE | 102011013163 A1 | 9/2012 |
| DE | 102012009159 A1 | 11/2012 |
| DE | 102011108976 A1 | 1/2013 |
| DE | 102012008940 A1 | 11/2013 |
| DE | 112014000343 T5 | 9/2015 |
| DE | 102017100374 A1 | 7/2017 |
| DE | 202018107311 U1 | 2/2019 |
| EP | 1074426 A2 | 2/2001 |
| GB | 1136097 A | 12/1968 |
| GB | 1546104 A | 5/1979 |
| GB | 2441871 A | 3/2008 |
| JP | 2000084684 A | 3/2000 |
| JP | 2000153327 A | 6/2000 |
| JP | 2001186957 A | 7/2001 |
| JP | 2002119349 A | 4/2002 |
| JP | 5290789 B2 | 9/2013 |
| JP | 5555969 B2 | 7/2014 |
| KR | 20030092869 A | 12/2003 |
| KR | 100601809 B1 | 7/2006 |
| KR | 20070119332 A | 12/2007 |
| KR | 100817000 B1 | 3/2008 |
| KR | 20090035633 A | 4/2009 |
| KR | 20140001651 A | 1/2014 |
| KR | 101420164 B1 | 7/2014 |
| KR | 101655777 B1 | 9/2016 |
| WO | WO-9620848 A1 | 7/1996 |
| WO | 2006069630 A2 | 7/2006 |
| WO | WO-2011069107 A2 | 6/2011 |
| WO | WO-2013133245 A1 | 9/2013 |
| WO | 2013152433 A1 | 10/2013 |
| WO | WO-2013167240 A1 | 11/2013 |
| WO | 2015012287 A1 | 1/2015 |

(56) References Cited

FOREIGN PATENT DOCUMENTS

| WO | WO-2016115986 A1 | 7/2016 |
|---|---|---|
| WO | WO-2017118496 A1 | 7/2017 |
| WO | 2021020580 A1 | 2/2021 |

OTHER PUBLICATIONS

U.S. Appl. No. 17/720,609, filed Apr. 14, 2022, Ralph L. Schmitz.
Non-Final Office Action regarding U.S. Appl. No. 17/181,189 dated May 19, 2022.
Office Action regarding German Patent Application 10 2020 204 814.2 dated Jun. 8, 2022.
Office Action regarding U.S. Appl. No. 17/720,609 dated May 17, 2023.
Office Action regarding Chinese Patent Application No. 2020103050915, dated Jun. 23, 2022.
Office Action regarding Chinese Patent Application No. 020107827129, dated Jun. 1, 2022.
Office Action regarding Chinese Patent Application No. 2021102452677, dated Oct. 28, 2022.
Office Action regarding Chinese Patent Application No. 202010885551.6, dated Jul. 21, 2022.
German Office Action regarding Patent Application No. 102022201243.7, dated May 12, 2023.
Office Action regarding Canadian Patent Application No. 2,812,408, dated Jun. 17, 2016.
Office Action regarding German Patent Application No. 102016114406.1, dated Apr. 27, 2020. Translation provided by Witte, Weller & Partner Patentanwälte mbB.
International Search Report regarding International Application No. PCT/US2020/021377, dated Jun. 30, 2020.
Written Opinion of the International Searching Authority regarding International Application No. PCT/US2020/021377, dated Jun. 30, 2020.
Office Action regarding German Patent Application No. 102020208717.2, dated Feb. 16, 2021.
Office Action regarding German Patent Application No. 102019211855.0, dated Feb. 4, 2021. Partial translation provided by Bardehle Pagenberg Partnerschaft mbB.
SPI Lasers UK Ltd., "Opening new possibilities with single mode oscillation welding (CW)." Presented at: Laser World of Photonics China; Shanghai, China (Mar. 2008).
Office Action regarding German Patent Application No. 102019212517.4, dated Mar. 11, 2021. Partial translation provided by Bardehle Pagenberg Partnerschaft mbB.
Office Action regarding Indian Patent Application No. 201921032346, dated Mar. 18, 2021.
Office Action regarding Chinese Patent Application No. 201910334168.9, dated Apr. 30, 2021. Translation provided by Unitalen Attorneys at Law.
Office Action regarding German Patent Application No. 102013103671.6, dated May 20, 2021. Translation provided by Witte, Weller & Partner Patentanwälte mbB.
First Chinese Office Action regarding Application No. 201910801476.8 dated Aug. 10, 2021. English translation provided by Unitalen Attorneys at Law.
Office Action regarding U.S. Appl. No. 16/996,991, dated Sep. 9, 2021.
Notice of Allowance regarding U.S. Appl. No. 16/996,991, dated Oct. 4, 2021.
Office Action regarding U.S. Appl. No. 16/542,369, dated Jul. 16, 2021.
Office Action regarding U.S. Appl. No. 16/542,369, dated May 17, 2021.
Notice of Allowance regarding U.S. Appl. No. 16/542,369, dated Oct. 10, 2021.
Office Action regarding U.S. Appl. No. 16/842,135, dated Sep. 16, 2021.
Office Action regarding U.S. Appl. No. 16/740,874, dated Apr. 26, 2021.
Office Action regarding U.S. Appl. No. 16/740,874, dated Aug. 16, 2021.
Office Action regarding U.S. Appl. No. 16/811,112, dated Sep. 3, 2021.
Office Action regarding German Application No. 102019110151.4, dated Jul. 12, 2021.
Office Action regarding German Patent Application No. 102020200559.1, dated Jul. 23, 2021.
Office Action regarding Chinese Patent Application No. 201910725351.1, dated Jul. 5, 2021.
Office Action regarding U.S. Appl. No. 16/740,874, dated Oct. 20, 2021.
Office Action regarding German Patent Application No. 10 2019 211 855.0, dated Nov. 25, 2021.
Office Action regarding Chinese Patent Application No. 2021120202214440, dated Dec. 7, 2021.
Office Action regarding Chinese Patent Application No. 201910801476.8, dated Dec. 17, 2021.

\* cited by examiner

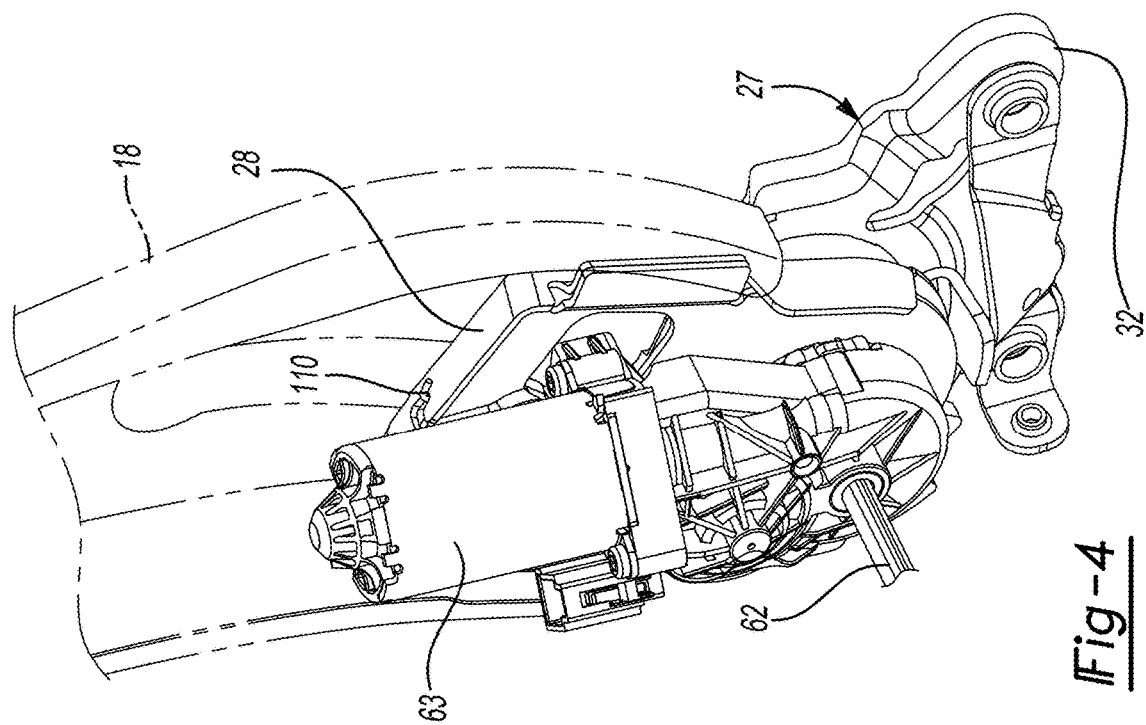
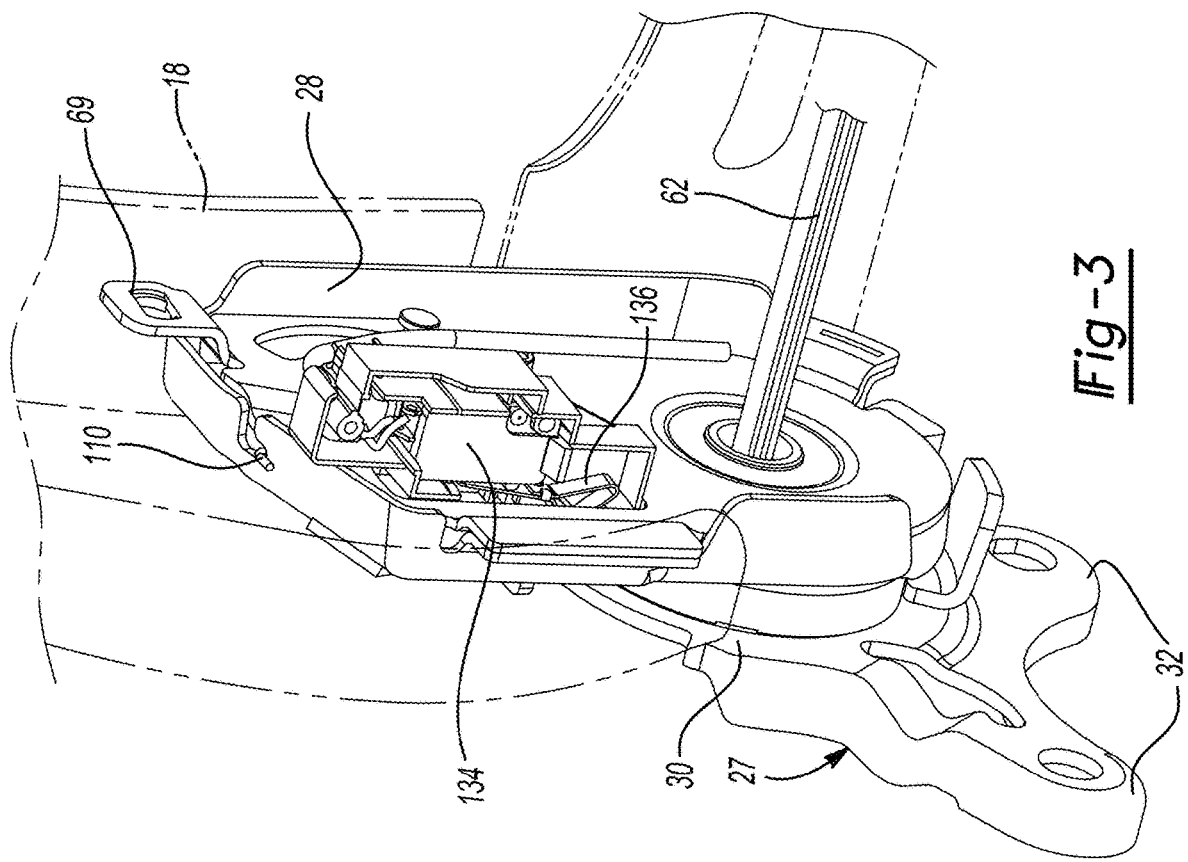

RELEASE MECHANISM FOR SEAT RECLINER ASSEMBLY

CROSS-REFERENCE TO RELATED APPLICATIONS

This application claims the benefit of U.S. Provisional Application No. 63/149,799 filed on Feb. 16, 2021. The entire disclosure of the above application is incorporated herein by reference.

FIELD

The present disclosure relates to a release mechanism for a seat recliner assembly.

BACKGROUND

This section provides background information related to the present disclosure and is not necessarily prior art.

Vehicle seats often include a recliner heart that can rotate a seatback relative to a seat bottom. Some vehicle seats can also include a release mechanism (or dump mechanism) to enable the seatback to be moved from a relatively upright position to a forward dump position (e.g., to enable a passenger to ingress into and egress out of a space behind the seat such as a rear seating row). A release lever (or actuation lever) can be mounted on an upper, outboard portion of the seatback and can be connected to the release mechanism by a cable and/or link. The release lever can be manually moved by a user to actuate the release mechanism. The release mechanism may not be easily adaptable to both power and manual recliners. The release mechanism may also not allow the seatback to be moved from any seating position (e.g., a rearward-reclined position, an upright position, and/or a forward-tilt position) to the forward dump position.

SUMMARY

This section provides a general summary of the disclosure and is not a comprehensive disclosure of its full scope or all of its features.

In one form, the present disclosure provides a seatback adjustment assembly that includes a first bracket plate, a recliner heart, an attachment plate, and a lever. The first bracket plate is adapted to be rotationally fixed to a seatback. The recliner heart is mounted to the first bracket plate and includes a first plate and a second plate. The recliner heart is operable in an unlocked state in which the second plate is rotatable relative to the first plate and a locked state in which the second plate is fixed relative to the first plate. The attachment plate is rotationally fixed to the second plate and includes first teeth. The lever is rotatably coupled to the first bracket plate and includes second teeth. The lever is rotatable between a first state in which the second teeth are meshingly engaged with the first teeth and a second state in which the second teeth are disengaged from the first teeth. When the recliner heart is in the unlocked state and the lever is in the first state, rotation of the second plate and the attachment plate causes corresponding rotation of the seatback relative to a seat bottom. The first bracket plate is configured to rotate to move the seatback relative to the seat bottom without causing corresponding rotation of the second plate and the attachment plate when the lever is in the second state.

In some configurations of the seatback adjustment assembly of the above paragraph, a cam is rotatably coupled to the first bracket plate and includes a locking surface. The cam is rotatable between a first position in which the locking surface engages an outer surface of the lever to prevent the lever from rotating from the first state toward the second state, and a second position in which the locking surface is disengaged from the outer surface of the lever to allow the lever to rotate from the first state toward the second state.

In some configurations of the seatback adjustment assembly of any one or more of the above paragraphs, a biasing member rotationally biases the cam toward the first position.

In some configurations of the seatback adjustment assembly of any one or more of the above paragraphs, an actuation lever is mounted on the seatback and is operatively connected to the cam such that movement of the actuation lever causes corresponding rotation of the cam into the second position.

In some configurations of the seatback adjustment assembly of any one or more of the above paragraphs, the seatback adjustment assembly further includes a motor and a control switch. The motor is operable between an ON mode in which the motor is allowed to operate the recliner heart and an OFF mode in which the motor is prevented from operating the recliner heart. The control switch is electrically coupled to the motor and includes a tab moveable between a first position in which the motor is in the ON mode and a second position in which the motor is in the OFF mode. When the lever is in the second state, the lever moves the tab from the first position to the second position.

In some configurations of the seatback adjustment assembly of any one or more of the above paragraphs, the motor and the recliner heart are adjacent to each other. The control switch is located remotely relative to the recliner heart and the motor.

In some configurations of the seatback adjustment assembly of any one or more of the above paragraphs, the seatback adjustment assembly further includes a cam, a connecting member, a pin, and a biasing member. The cam is rotatably coupled to the first bracket plate and includes a locking surface. The connecting member is coupled to the cam and includes an aperture. The mounting plate is coupled to the first bracket plate and includes an arcuate slot. The pin extends through the aperture and the slot. The biasing member biases the pin toward an end of the slot such that the locking surface of the cam engages an outer surface of the lever to prevent the lever from rotating from the first state toward the second state.

In some configurations of the seatback adjustment assembly of any one or more of the above paragraphs, an actuation lever is mounted on the seatback and is operably connected to the pin such that movement of the actuation lever causes the pin to traverse the slot and the cam to rotate. When the pin traverses the slot and the cam rotates, the locking surface of the cam is disengaged from the outer surface of the lever thereby allowing the lever to rotate from the first state toward the second state.

In some configurations of the seatback adjustment assembly of any one or more of the above paragraphs, the actuation lever is connected to the pin via a cable.

In some configurations of the seatback adjustment assembly of any one or more of the above paragraphs, the recliner heart is a round recliner heart. The first plate is rotationally fixed to the seat bottom.

In some configurations of the seatback adjustment assembly of any one or more of the above paragraphs, the seatback adjustment assembly further includes a second bracket plate and a stop member. The second bracket plate is rotationally fixed to the seat bottom. The stop member is fixed to the second bracket plate and includes first and second end portions. When the recliner heart is in the unlocked state and the lever is in the first state, the attachment plate is configured to contact one of the first and second end portions to limit further rotation of the seatback relative to the seat bottom.

In some configurations of the seatback adjustment assembly of any one or more of the above paragraphs, the seatback adjustment assembly further includes a second bracket plate and a stop member. The second bracket plate is rotationally fixed to the seat bottom and includes a lip. The stop member is fixed to the first bracket plate. When the lever is in the second state, the stop member is configured to contact the lip to limit further rotation of the seatback relative to the seat bottom.

In another form, the present disclosure provides a seatback adjustment assembly that includes a bracket plate, a recliner heart, an attachment plate, a lever, and an actuation lever. The bracket plate is adapted to be rotationally fixed to a seatback. The recliner heart is mounted to the bracket plate and includes a first plate and a second plate. The recliner heart is operable in an unlocked state in which the second plate is rotatable relative to the first plate and a locked state in which the second plate is fixed relative to the first plate. The attachment plate is rotationally fixed to the second plate and includes first teeth. The lever is rotatably coupled to the bracket plate and includes second teeth. The lever is rotatable between a first state in which the second teeth are meshingly engaged with the first teeth and a second state in which the second teeth are disengaged from the first teeth. The actuation lever is operatively connected to the lever and moveable between a secure position in which the lever is in the first state and a release position in which the lever is in the second state. Movement of the actuation lever from the secure position to the release position allows rotation of the bracket plate to move the seatback relative to a seat bottom without causing corresponding rotation of the second plate and the attachment plate.

In some configurations of the seatback adjustment assembly of the above paragraph, a cam is rotatably coupled to the bracket plate and includes a locking surface. When the actuation lever is in the first state, the locking surface engages an outer surface of the lever to prevent the lever from rotating from the first state toward the second state.

In some configurations of the seatback adjustment assembly of any one or more of the above paragraphs, a biasing member rotationally biases the cam such that the locking surface of the cam engages the outer surface of the lever.

In some configurations of the seatback adjustment assembly of any one or more of the above paragraphs, movement of the actuation lever from the secure position to the release position overcomes a biasing force of the biasing member.

In some configurations of the seatback adjustment assembly of any one or more of the above paragraphs, the seatback adjustment assembly further includes a cam, a connecting member, a mounting plate, a pin and a biasing member. The cam is rotatably coupled to the bracket plate and includes a locking surface. The connecting member is fixed to the cam and includes an aperture. The mounting plate is coupled to the bracket plate and includes an arcuate slot. The pin is operatively connected to the actuation lever and engages the arcuate slot and the aperture. The biasing member biases the pin toward an end of the slot such that the locking surface of the cam engages an outer surface of the lever to prevent the lever from rotating from the first state toward the second state.

In some configurations of the seatback adjustment assembly of any one or more of the above paragraphs, when the actuation lever is moved from the secure position to the release position, the pin traverses the slot and the cam rotates such that the locking surface is disengaged from the outer surface of the lever thereby allowing the lever to rotate from the first state toward the second state.

In some configurations of the seatback adjustment assembly of any one or more of the above paragraphs, the seatback adjustment assembly further includes a motor and a control switch. The motor is operable between an ON mode in which the motor is allowed to operate the recliner heart and an OFF mode in which the motor is prevented from operating the recliner heart. The control switch is electrically coupled to the motor and includes a tab moveable between a first position in which the motor is in the ON mode and a second position in which the motor is in the OFF mode. When the lever is in the second state, the lever moves the tab from the first position to the second position.

In some configurations of the seatback adjustment assembly of any one or more of the above paragraphs, the motor and the recliner heart are adjacent to each other. The control switch is located remotely relative to the recliner heart and the motor.

In some configurations of the seatback adjustment assembly of any one or more of the above paragraphs, the recliner heart is a round recliner heart. The first plate is rotationally fixed to the seat bottom.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a perspective view of one recliner mechanism of the seatback adjustment assembly of FIG. 2 coupled to a first side of the seatback frame;

FIG. 4 is a perspective view of another recliner mechanism of the seatback adjustment assembly coupled to a second side of the seatback frame;

Corresponding reference numerals indicate corresponding parts throughout the several views of the drawings.

DETAILED DESCRIPTION

Figure 1:
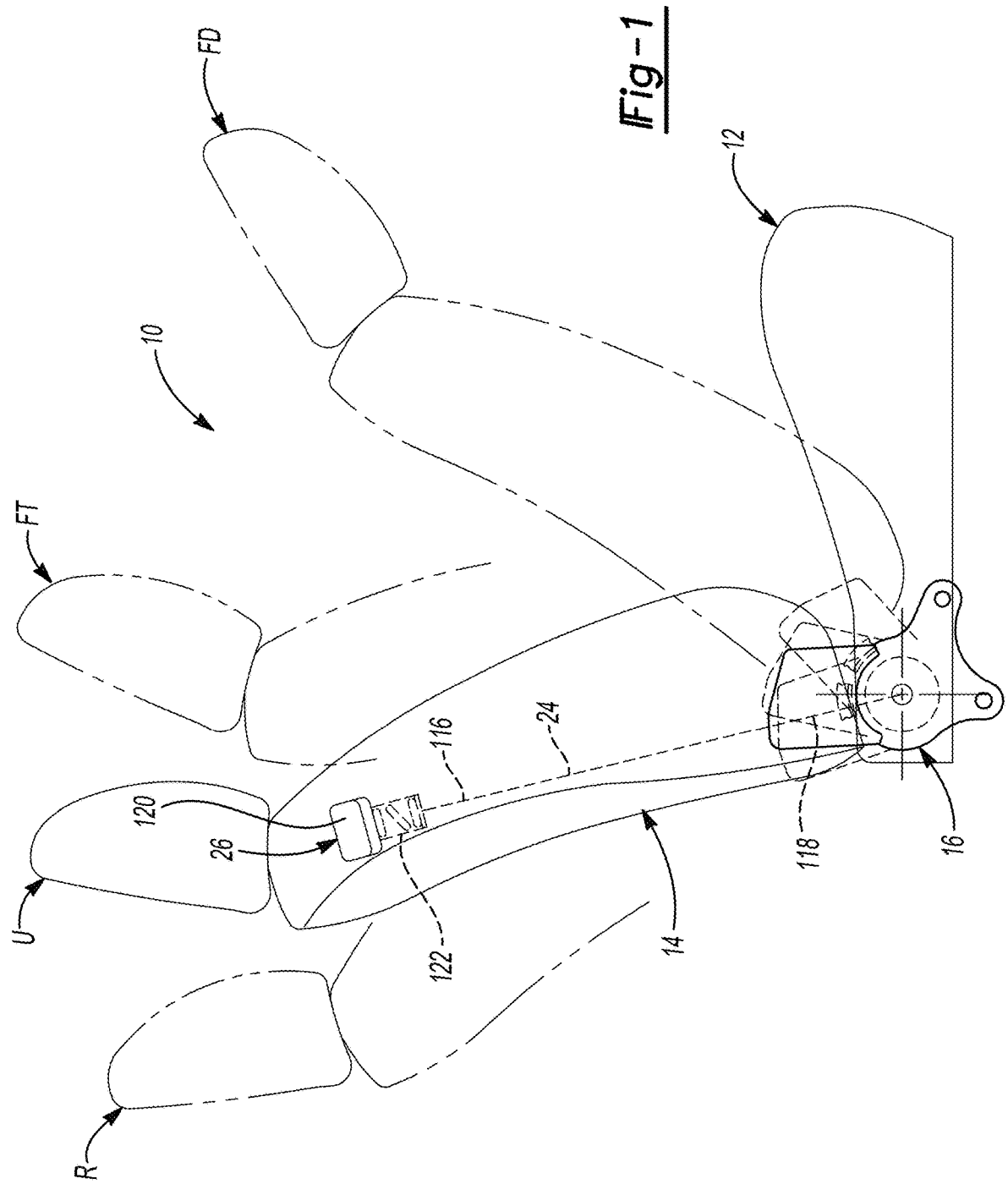
FIG. 1 is a side view of a vehicle seat assembly in an upright position according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
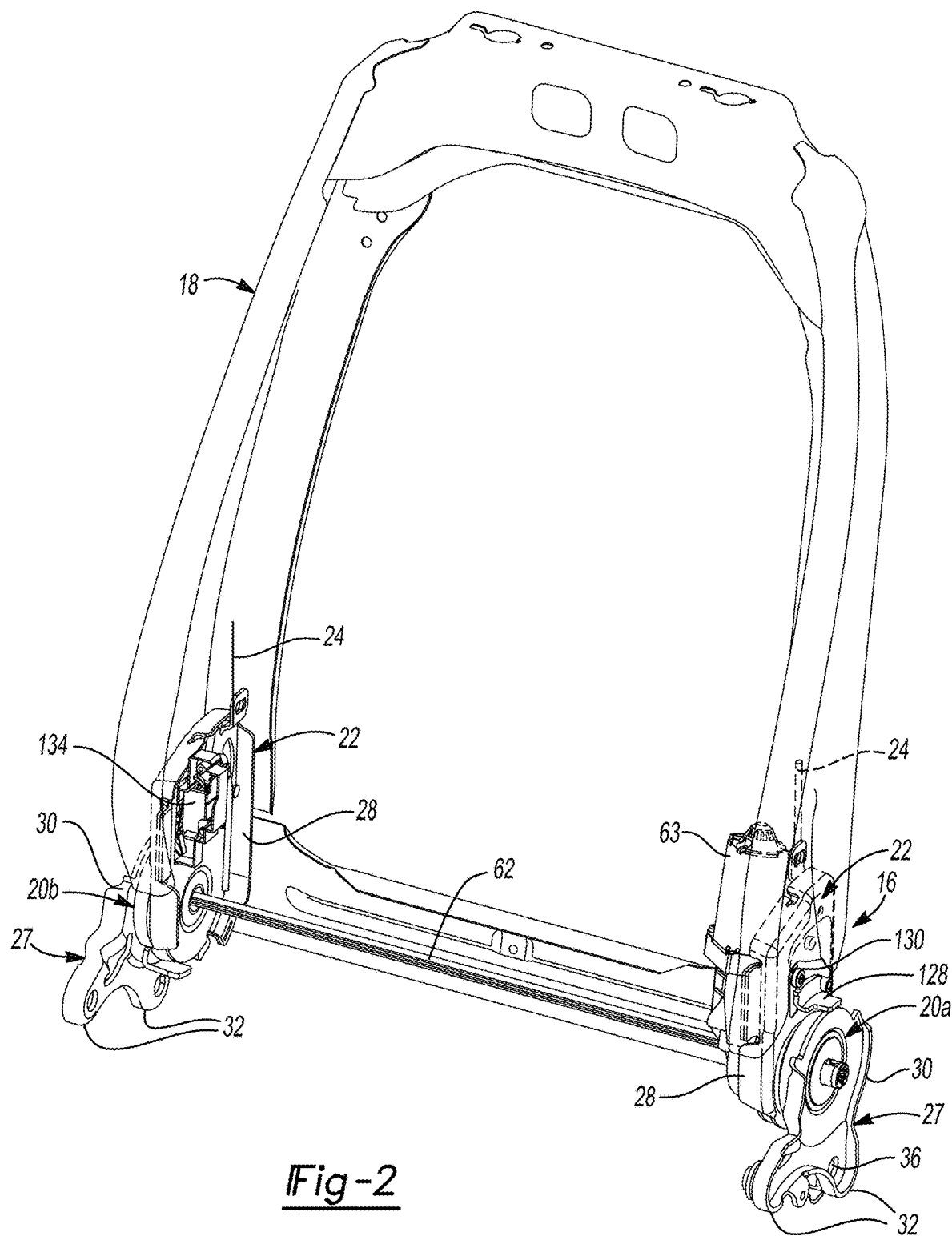
FIG. 2 is a perspective of a seatback adjustment assembly coupled to a seatback frame.

With reference to FIGS. 1 and 2, a vehicle seat assembly 10 is provided that may include a seat bottom 12, a seatback 14, and a seatback adjustment assembly 16. The seatback 14 includes a seatback frame 18 (FIG. 2), and the seat bottom 12 includes a seat bottom frame (not shown). As shown in FIG. 1, the seatback 14 is mounted to the seat bottom 12 and is rotatable relative to the seat bottom 12 among a rearward-reclined position R, an upright position U, a forward-tilt position FT, and a forward-dump position FD.

As shown in FIG. 2, the seatback adjustment assembly 16 may include a pair of recliner mechanisms 20a, 20b, a pair of release or forward-dump mechanisms 22, a pair of cables 24, and an actuation assembly 26 (shown in FIG. 1). The recliner mechanisms 20a, 20b are operable to move the seatback 14 among the rearward-recline position R, the upright position U, the forward-tilt position FT, and a plurality of positions between the rearward-recline and forward-tilt positions.

Figure 5:
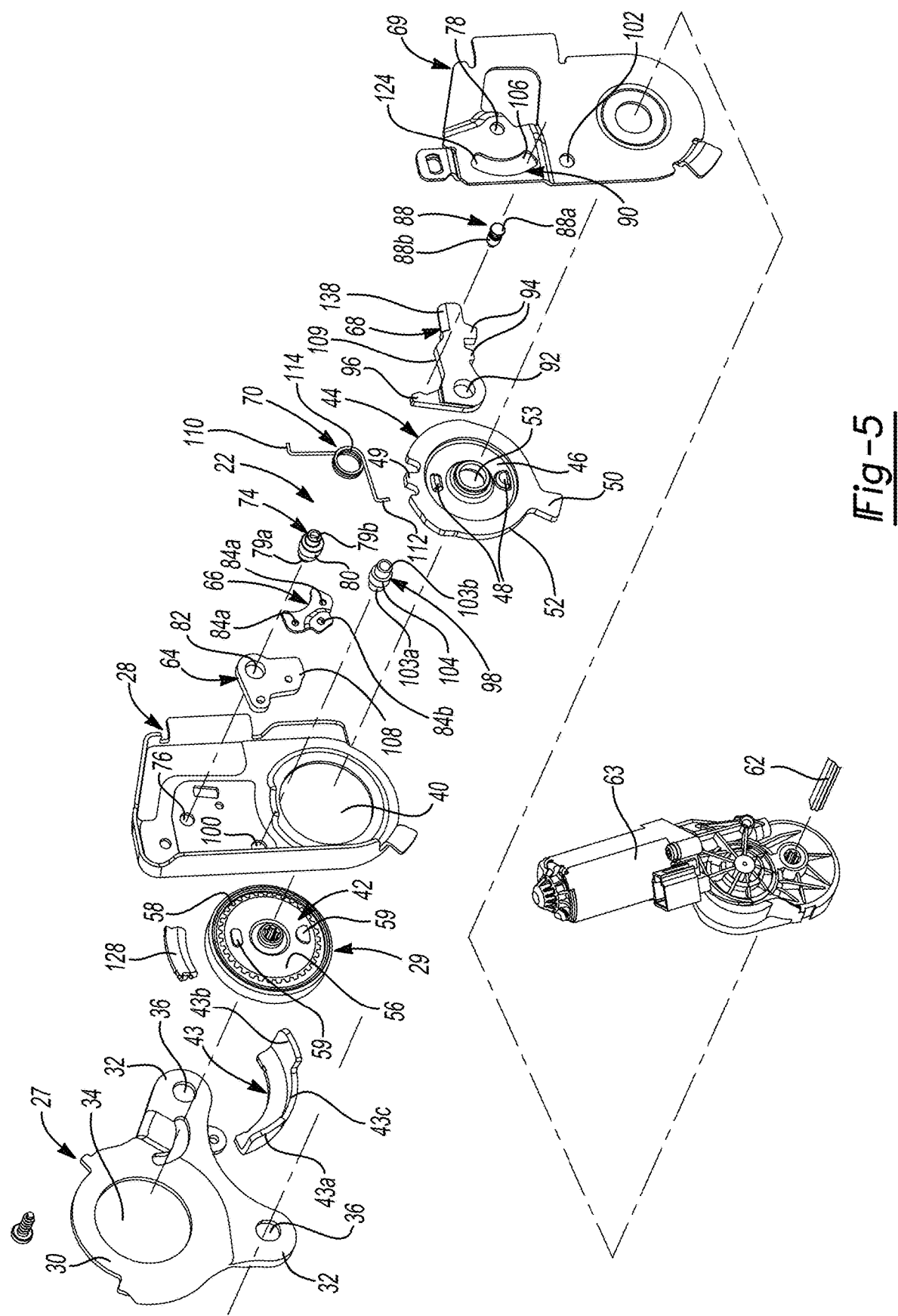
FIG. 5 is an exploded view of one recliner mechanism and one forward-dump mechanism of the seatback adjustment assembly.
Figure 6:
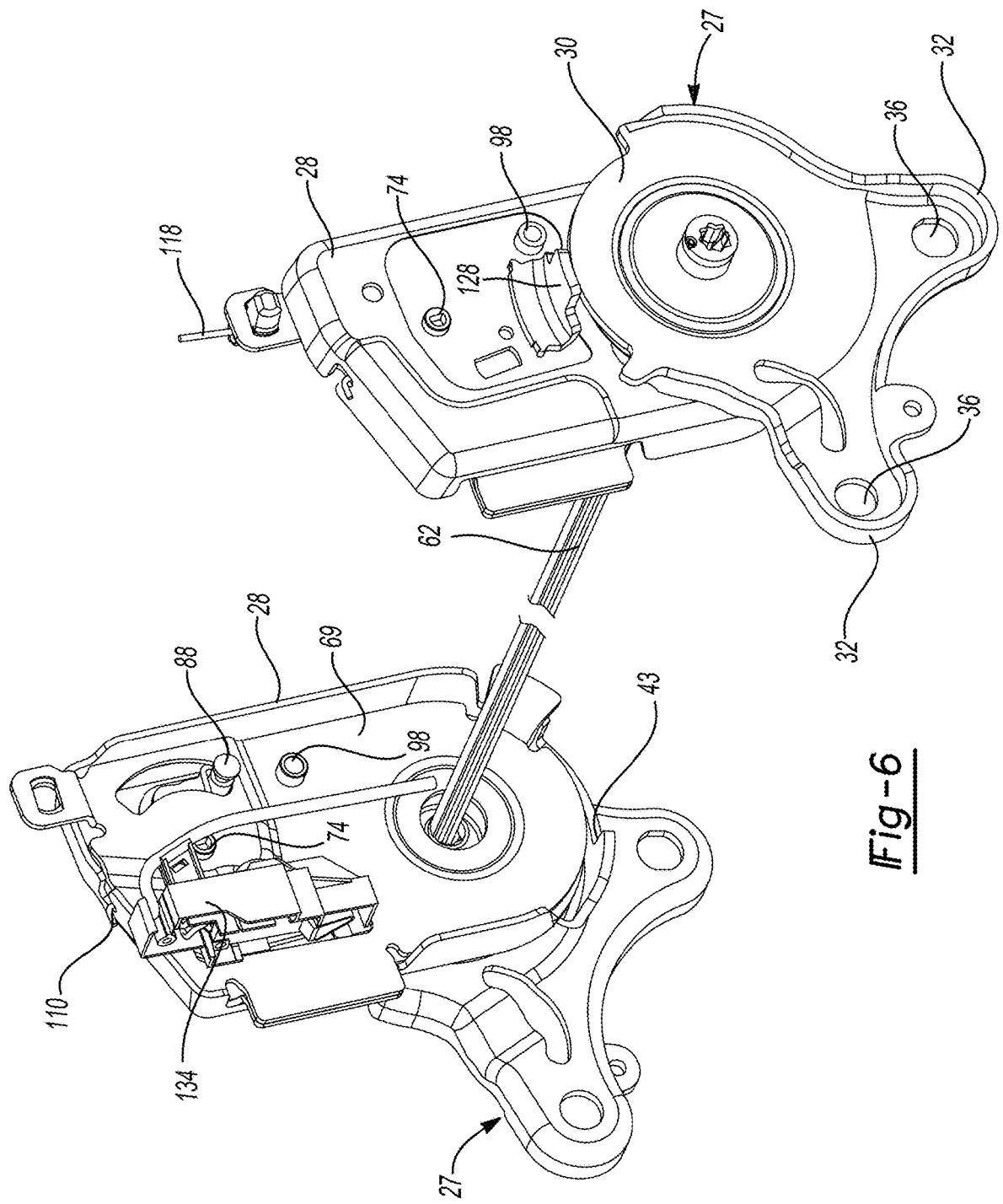
FIG. 6 is a perspective view of the seatback adjustment assembly when the seat assembly is in a forward-tilt position.

Each recliner mechanism 20a, 20b may be operable in a locked state preventing relative rotation between the seatback 14 and the seat bottom 12, and an unlocked state permitting relative rotation between the seatback 14 and the seat bottom 12. As shown in FIG. 5, the recliner mechanism 20a may include a first bracket plate 27, a second bracket plate 28, and a recliner heart (or locking mechanism) 29. The first bracket plate 27 may be rotationally fixed to the seat bottom frame and may include a generally round main body 30 and a pair of mounting lobes 32 that extend outward from the main body 30. The main body 30 may define a central aperture 34. The mounting lobes 32 may include a plurality of apertures 36 through which fasteners (not shown) may extend to securely attach the first bracket plate 27 to the seat bottom frame. As shown in FIGS. 2-4, the second bracket plate 28 may be rotationally fixed to the seatback frame 18 and may include a central aperture 40 (FIG. 5), which receives the recliner heart 29.

The recliner heart 29 may be mounted to the first and second bracket plates 27, 28 and may selectively permit relative rotation between the seatback 14 and the seat bottom 12. The recliner heart 29 may be a round recliner heart, for example, or any other suitable type recliner heart. The recliner heart 29 may include a first plate (not shown), a second plate 42 (FIG. 5) and a locking mechanism (not shown). The first plate may be attached to the first bracket plate 27.

As shown in FIGS. 6-10 and 12-16, an arcuate stop member 43 may be fixed to the body 30 of the first bracket plate 27. The stop member 43 may include a first end portion 43a, a second end portion 43b, and an elongated middle portion 43c. The first end portion 43a extends outwardly from a first end of the middle portion 43c and the second end portion 43b extends outwardly from a second end of the middle portion 43c.

An attachment plate 44 may be rotationally fixed to the second plate 42 and may be selectively engaged with the second bracket plate 28 via a respective forward-dump mechanism 22. As shown in FIG. 5, the attachment plate 44 may include a plate body 46, projections 48, teeth 49, and a tab 50. The circular-shaped plate body 46 may define an opening 53 extending through a center portion thereof. The projections 48 may extend from a surface of the plate body 46. The teeth 49 may be formed in an outer diametrical surface 52 of the plate body 46.

Figure 7:
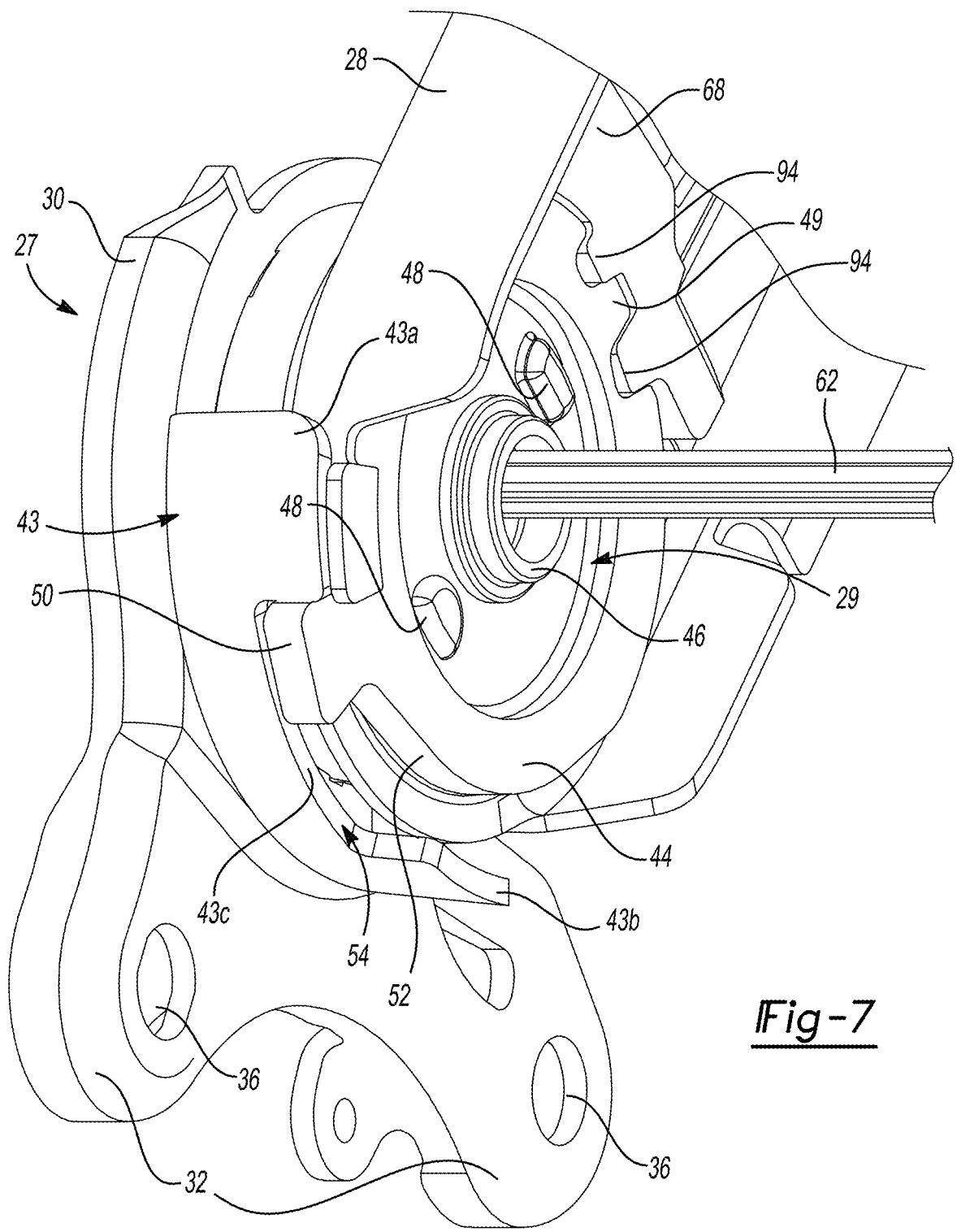
FIG. 7 is a partial perspective view of one recliner mechanism of the seatback adjustment assembly when the seat assembly is in the forward-tilt position.
Figure 8:
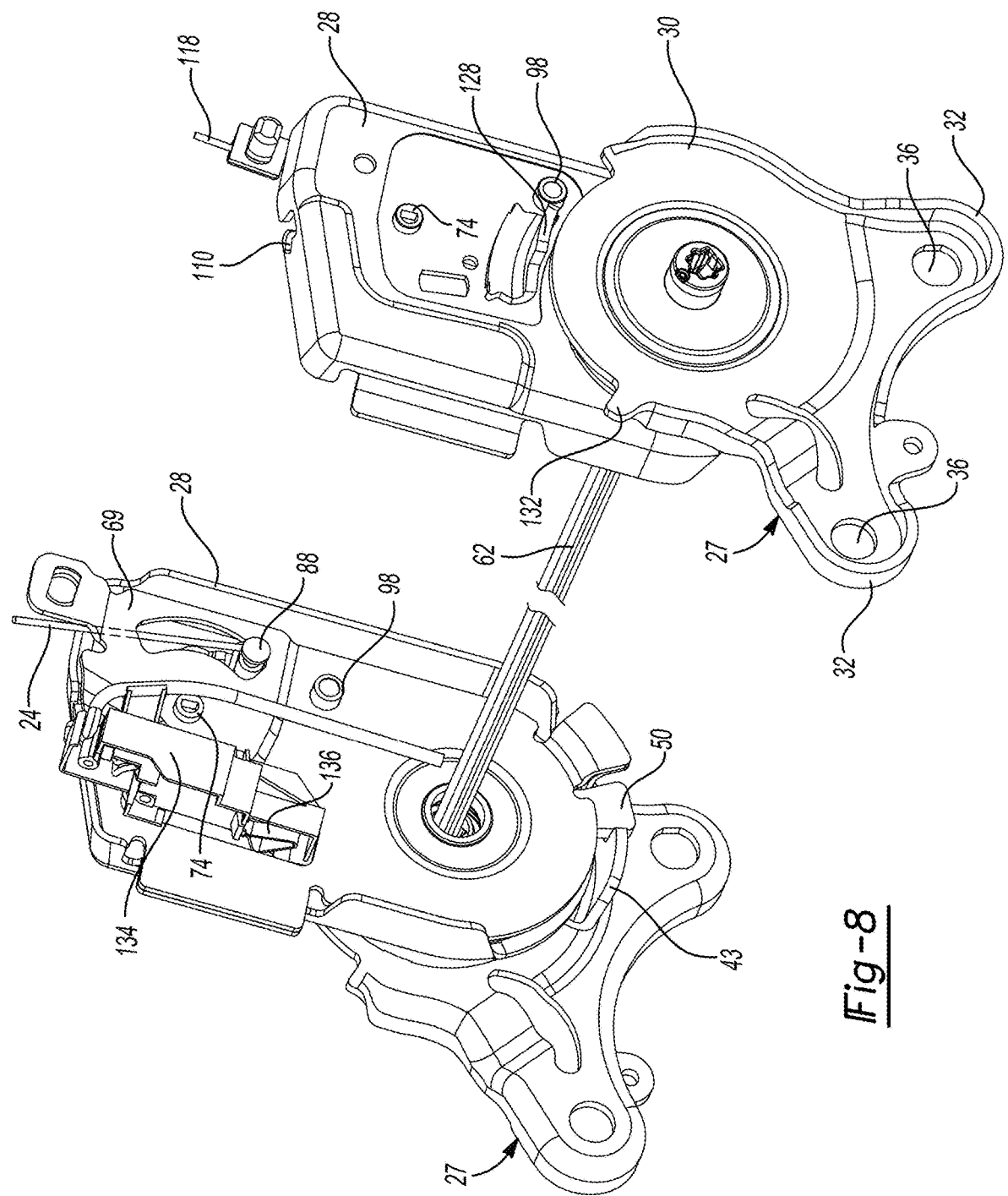
FIG. 8 is a perspective view of the seatback adjustment assembly when the seat assembly is in a rearward-recline position.
Figure 9:
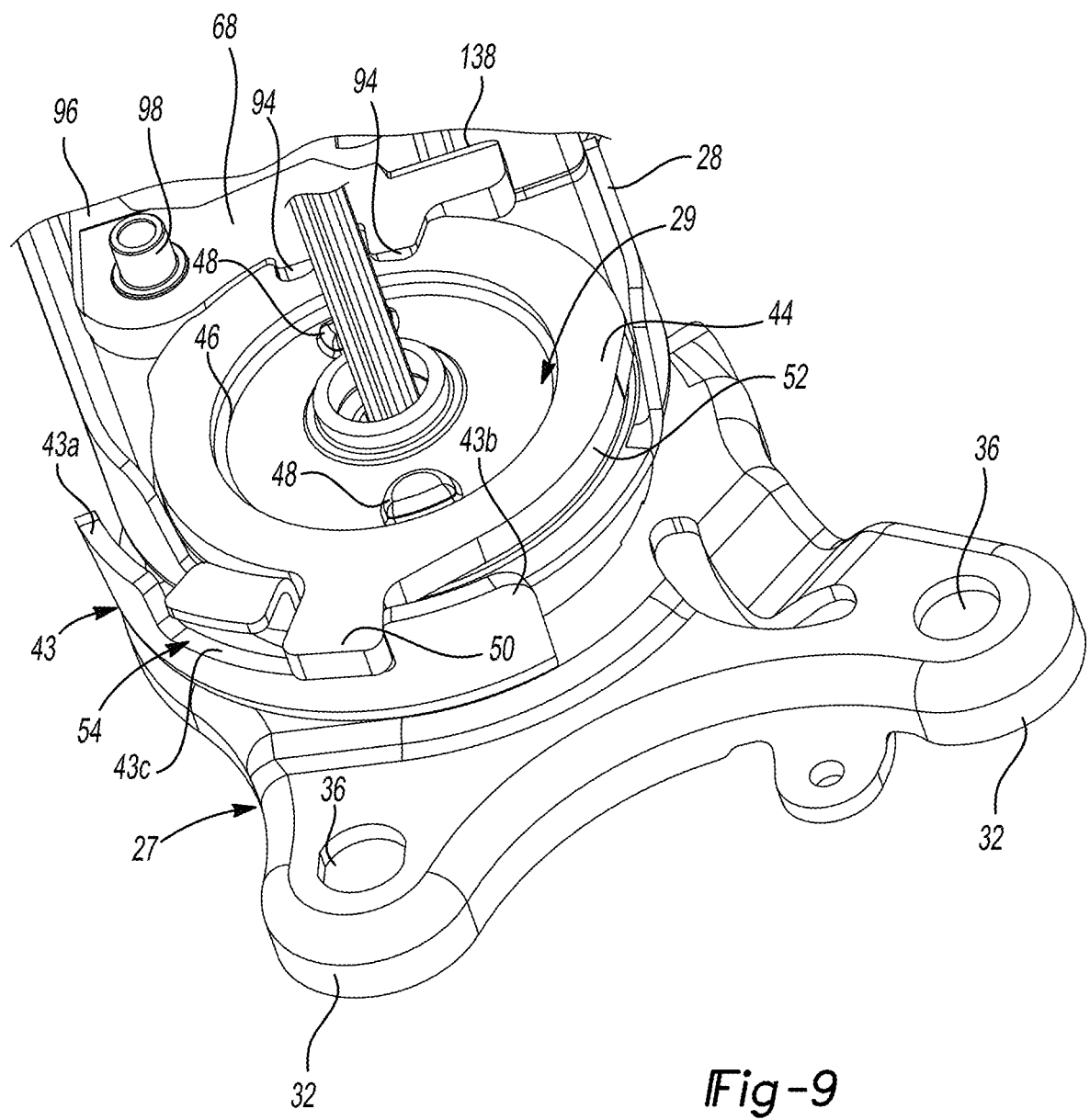
FIG. 9 is a partial perspective view of one recliner mechanism of the seatback adjustment assembly when the seat assembly is in the rearward-recline position.

The tab 50 may protrude outwardly from the outer diametrical surface 52 of the attachment plate 44 and may be received in a slot 54 defined between the first and second end portions 43a, 43b of the stop member 43 (FIGS. 7 and 9). In this way, when the attachment plate 44 is engaged with the second bracket plate 28 (via the respective forward-dump mechanism 22), the tab 50 may contact the first end portion 43a when the seatback 14 is in the forward-tilt position FT (FIG. 7) to limit further rotation of the seatback 14 in the forward-tilt position FT, and may contact the second end portion 43b when the seatback 14 is in the rearward-reclined position R (FIG. 9) to limit further rotation of the seatback 14 in the rearward-reclined position R.

The second plate 42 may be a generally circular shape and may be rotationally fixed to the attachment plate 44. In this way, when the attachment plate 44 is engaged with the second bracket plate 28 (via the respective forward-dump mechanism 22), rotation of the second plate 42 causes corresponding rotation of the seatback 14 (via the bracket plate 28). The second plate 42 may also cooperate with the first plate to define a cavity (not shown) in which the locking mechanism is disposed.

As shown in FIG. 5, the second plate 42 may include, inter alia, a plate body 56 and a rim 58. The plate body 56 may include projections 59 that extend from a surface of the plate body 56. The projections 59 may be received in respective openings of the projections 48 of the attachment plate 44, thereby rotationally fixing the second plate 42 and the attachment plate 44. The rim 58 may extend 360 degrees around a periphery of the plate body 56.

The locking assembly (not shown) may include, inter alia, a hub (not shown), a cam (not shown), a bushing ring (not shown), wedges (not shown), and a spring (not shown). The hub may engage a cross member 62 and may be rotationally fixed to the cam. The wedges may be positioned between the bushing ring and the cam. The spring may bias the wedges outwardly such that the wedges are wedged between the cam and the bushing ring, and the recliner mechanism 20a is in the locked state (the seatback 14 is prevented from rotating relative to the seat bottom 12). When a user actuates a switch (not shown), a motor 63 drives the cross member 62 which causes the hub and the cam to rotate. Rotation of the hub and the cam causes rotation of the second plate 42. A portion of teeth (not shown) of the second plate 42 are meshingly engaged with a portion of teeth (not shown) of the first plate at different points in the rotational path as the second plate 42 rotates about the first plate. The recliner heart 29 can be similar or identical to that disclosed in Assignee's U.S. Patent Application Publication No. 2020/0331367, the disclosure of which is incorporated herein by reference.

The structure and function of the recliner mechanism 20b may be similar or identical to that of the recliner mechanism 20a, and therefore, will not be described again in detail.

The recliner mechanisms 20a, 20b shown in the figures are constantly engaged, powered round-recliner mechanisms. While the recliner mechanisms 20a, 20b are shown as being constantly engaged round-recliner mechanisms, the recliner mechanisms 20a, 20b could alternatively be discontinuous round-recliner mechanisms. Further, while the recliner mechanisms 20a, 20b are described as being powered (i.e., motor-driven) round-recliner mechanisms, the recliner mechanisms 20a, 20b could alternatively be manually actuated round-recliner mechanisms.

The forward-dump mechanisms 22 are quick-release mechanisms that are operable to allow the seatback 14 to be manually moved from a seating position (i.e., any of the rearward-recline, upright, and forward-tilt positions) to the forward-dump position (e.g., to allow ingress into and egress out of a seating row behind the seat assembly 10 in a vehicle) and from the forward-dump position back to the same previous seating position without operating the recliner mechanisms 20a, 20b.

As shown in FIG. 5, each forward-dump mechanism 22 is associated with a respective recliner mechanism 20a, 20b and may include a cam 64, a connecting member 66, a lever 68, a mounting plate 69, and a biasing member 70. The cam 64 is adapted to be pivotably mounted to the second bracket plate 28 of the respective recliner mechanism 20a, 20b and the mounting plate 69. That is, a mounting sleeve 74 extends between aligned apertures 76, 78 formed in the plates 28, 69, respectively. The sleeve 74 includes a cylindrical end segment 79a retained in the similarly-shaped aperture 76 formed in the second bracket plate 28, a cylindrical end segment 79b retained in the similar-shaped aperture 78 formed in the mounting plate 69, and a central segment 80 received in an aperture 82 formed in the cam 64.

The connecting member 66 is coupled to the cam 64 such that movement of the connecting member 66 causes the cam 64 to rotate about the sleeve 74. The connecting member 66 includes a plurality of first apertures 84a and a second aperture 84b. Fasteners (not shown) may extend through the plurality of first apertures 84a and apertures 86 of the cam 64 to couple the connecting member 66 and the cam 64 to each other. A pin 88 extends between and couples the connecting member 66 and the mounting plate 69. The pin 88 includes a cylindrical first end 88a received in an arcuate slot 90 formed in the mounting plate 69 and a cylindrical second end 88b retained in the similarly-shaped second aperture 84b of the connecting member 66. The first end 88a of the pin 88 traverses the slot 90 (moves relative to the slot 90) as the seatback 14 is manually moved from the seating position (i.e., any of the rearward-recline, upright, and forward-tilt positions) to the forward-dump position and from the forward-dump position back to the same previous seating position.

The lever 68 is pivotably mounted to the second bracket plate 28 and the mounting plate 69 between a first state (FIGS. 7, 9, 12, and 16; locked state) in which the lever 68 is engaged with the attachment plate 44 and a second state (FIGS. 13, 14, and 15; unlocked state) in which the lever 68 is disengaged from the attachment plate 44. When the lever 68 is engaged with the attachment plate 44, rotation of the second plate 42 as described above causes corresponding rotation of the bracket plate 28 and the seatback 14. When the lever 68 is disengaged from the attachment plate 44, rotation of the seatback 14 and the bracket plate 28 does not cause corresponding rotation of the attachment plate 44 and the second plate 42.

As shown in FIG. 5, the lever 68 includes an aperture 92, teeth 94, and an extension 96. A mounting sleeve 98 extends between aligned apertures 100, 102 formed in the plates 28, 69, respectively. The sleeve 98 includes a cylindrical end segment 103a retained in the similarly-shaped aperture 100 formed in the second bracket plate 28, a cylindrical end segment 103b retained in the similar-shaped aperture 102 formed in the mounting plate 69, and a central segment 104 received in the aperture 92 formed in the lever 68. When the lever 68 is in the first state, the teeth 94 are meshingly engaged with the teeth 49 of the attachment plate 44. When the lever 68 is in the second state, the teeth 94 are disengaged from the teeth 49 of the attachment plate 44.

Figure 15:
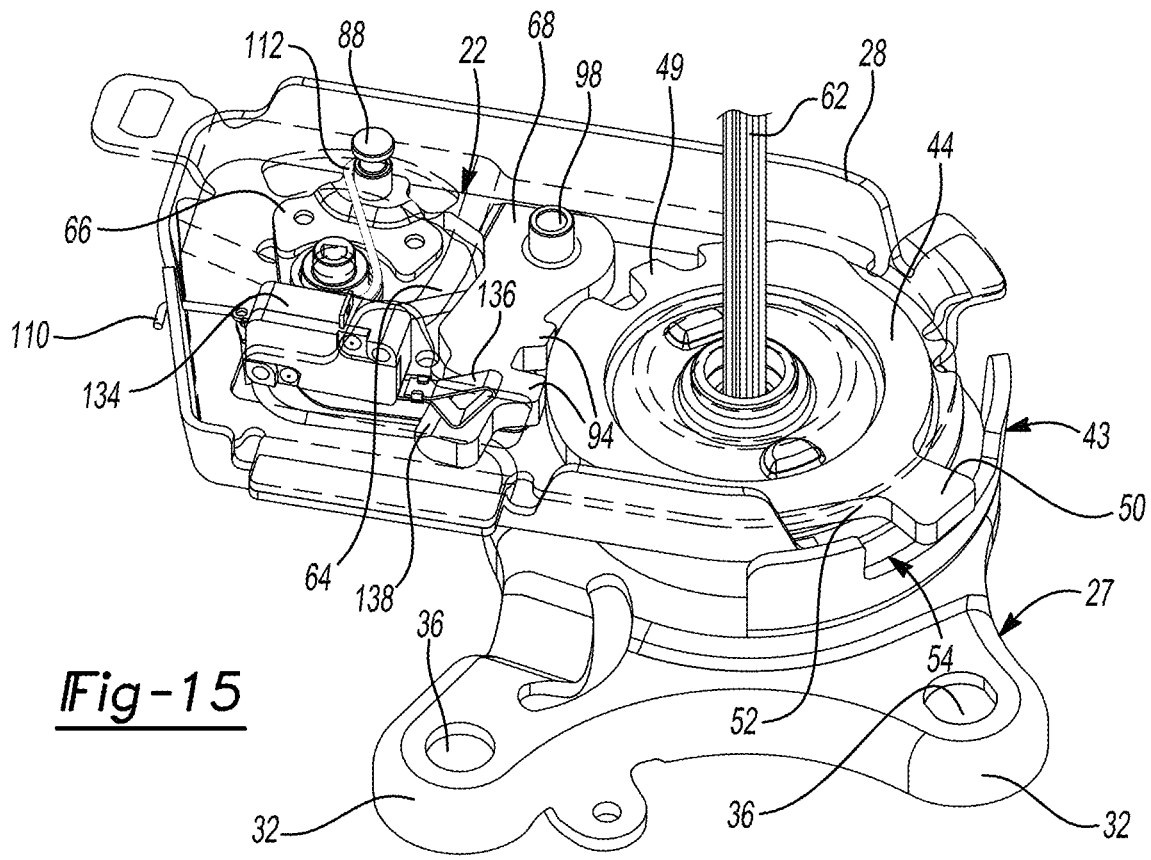
FIG. 15 is a perspective view of the recliner mechanism and forward-dump mechanism when the seat assembly is in the forward-dump position.
Figure 16:
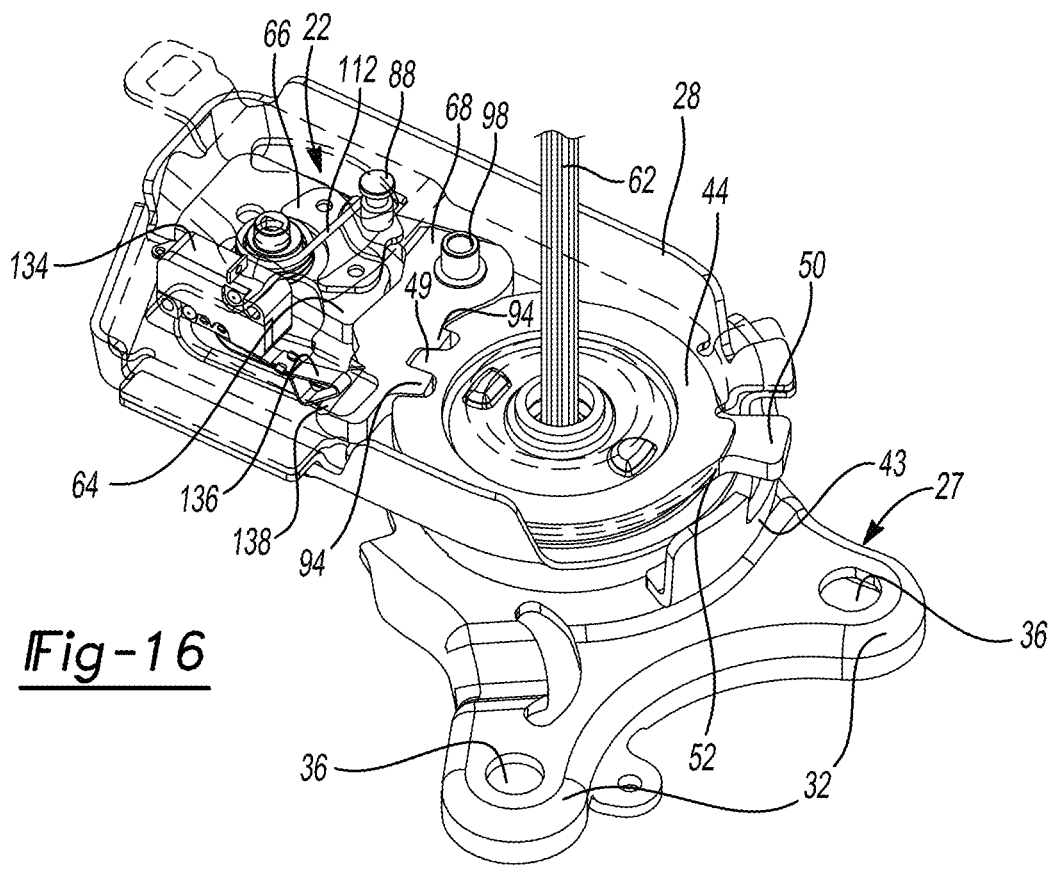
FIG. 16 is a perspective view of the recliner mechanism and forward-dump mechanism showing the lever of the forward-dump mechanism engaged with the recliner heart of the recliner mechanism.

The biasing member (e.g., a torsional spring) 70 biases the pin 88 towards a first end 106 of the slot 90 of the mounting plate 69, which causes a locking surface 108 of the cam 64 to engage an outer surface 109 of the lever 68, thereby urging the lever 68 into engagement with the attachment plate 44 (i.e., the teeth 94 of the lever 68 are meshingly engaged with the teeth 49 of the attachment plate 44). The biasing member 70 includes a first end 110, a second end 112, and a body 114. The first end 110 extends from a first end of the body 114 and is engaged with the second bracket plate 28 (FIGS. 13 and 15; received in a slot of the second bracket plate 28). The second end 112 extends from a second end of the body 114 and is engaged with the pin 88 (FIGS. 15 and 16). The body 114 surrounds the mounting sleeve 74. The biasing member 70 is arranged to continuously exert a biasing force on the pin 88 for urging the cam 64 to rotate in a first rotational direction (clockwise direction).

Each cable 24 extends from the actuation assembly 26 to a respective forward-dump mechanism 22. That is, a first end 116 of the cable 24 is engaged with the actuation assembly 26 (FIG. 1) and a second end 118 of the cable 24 is engaged with the pin 88 of the respective forward-dump mechanism 22.

As shown in FIG. 1, the actuation assembly 26 may be mounted on the seatback 14 (e.g., at or near an upper end of the seatback) and may be engaged to the first end 116 of the cable 24. The actuation assembly 26 may be operably connected to the cam 64 and the connecting member 66. The actuation assembly 26 may include an actuation lever 120 and a spring 122. The actuation lever 120 may be movable between a secure position and a release position. The spring 122 may bias the actuation lever 120 toward the secure position.

With reference to FIGS. 1-16, operation of the seatback adjustment assembly 16 will be described in detail. When a passenger (not shown) ingress into or egress out of a space (e.g., a rear seating row) behind the vehicle seat assembly 10, the passenger may facilitate entry into or departure out of the space by the actuation lever 120.

Movement of the actuation lever 120 from the secure position to the release position causes the pin 88 to move from the first end 106 of the slot 90 toward a second end 124 of the slot 90 via the cable 24 (compare FIGS. 12-14), which, in turn, causes the cam 64 to rotate in the first rotational direction and become disengaged from the lever 68 (the locking surface 108 of the cam 64 disengages from the surface 109 of the lever 68). As the pin 88 moves from the first end 106 of the slot 90 toward the second end 124 of the slot 90, the pin 88 also engages the extension 96 of the lever 68 such that the lever 68 rotates from the first state to the second state (the lever 68 rotates in a second rotational direction (counter-clockwise direction) from the first state to the second state). In this way, the teeth 94 of the lever 68 disengage from the teeth 49 of the attachment plate 44 and the seatback 14 may be rotated to the forward-dump position FD.

Figure 10:
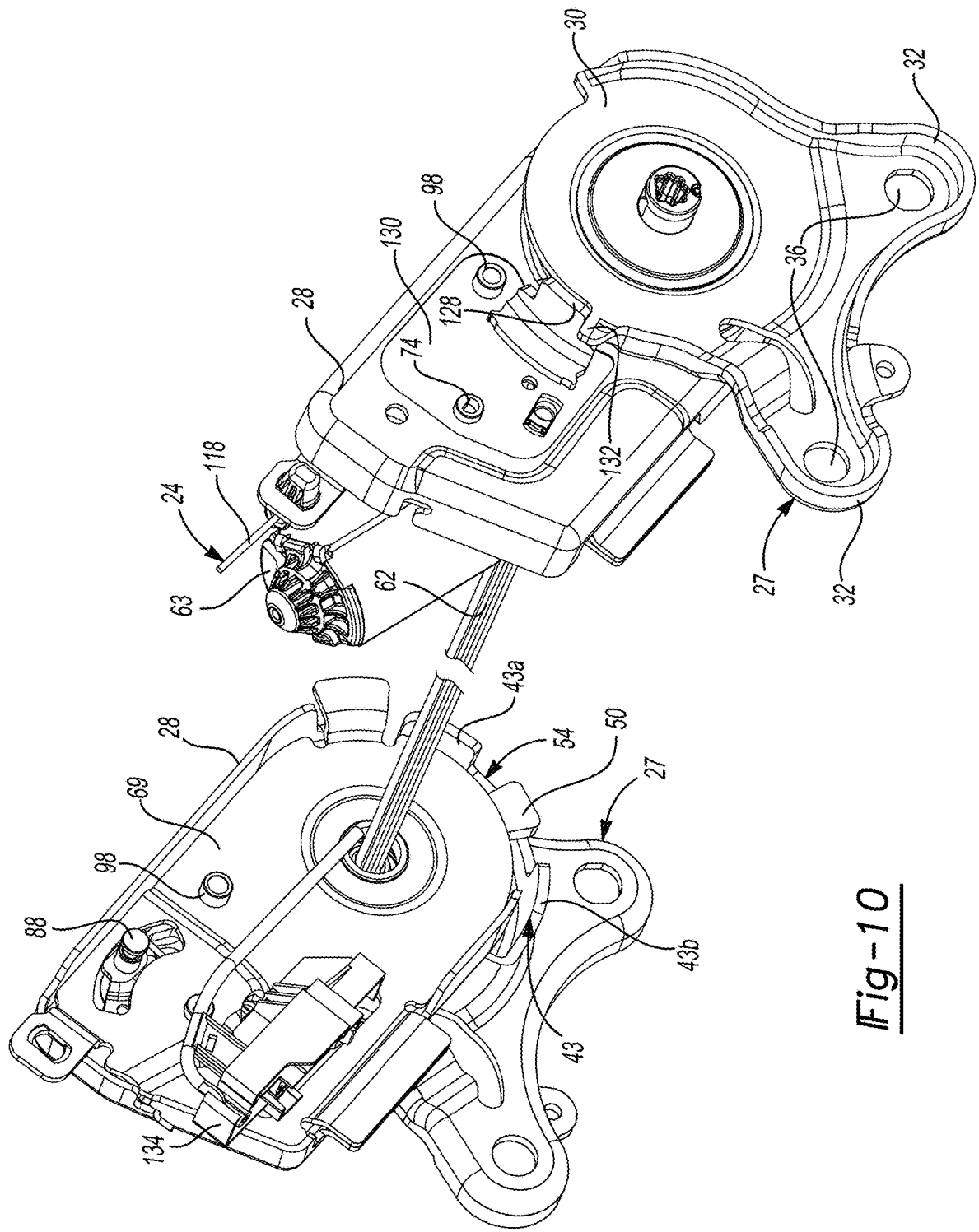
FIG. 10 is a perspective view of the seatback adjustment assembly when the seat assembly is in a forward-dump position.
Figure 11:
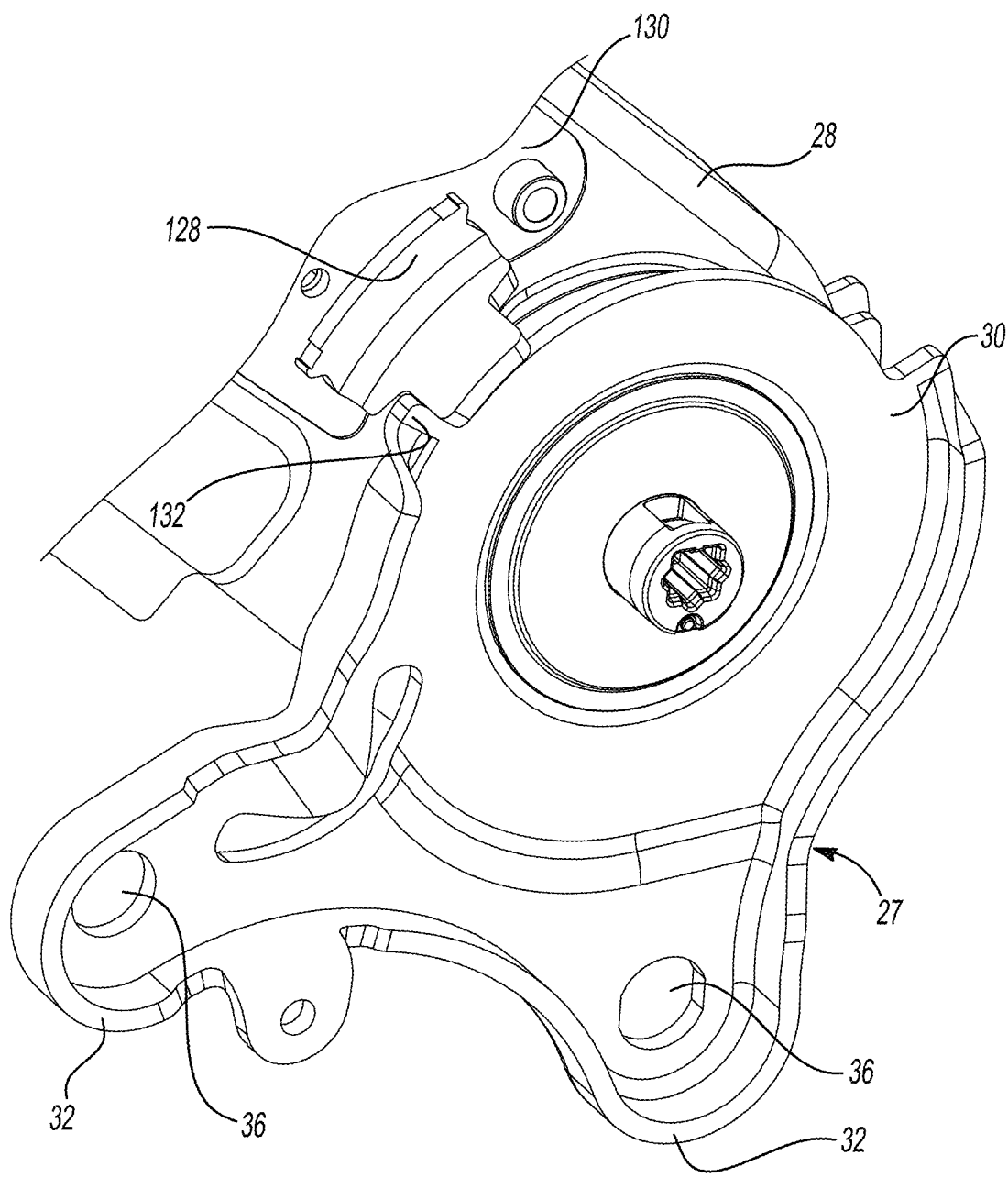
FIG. 11 is a partial perspective view of one recliner mechanism of the seatback adjustment assembly when the seat assembly is in the forward-dump position.
Figure 12:
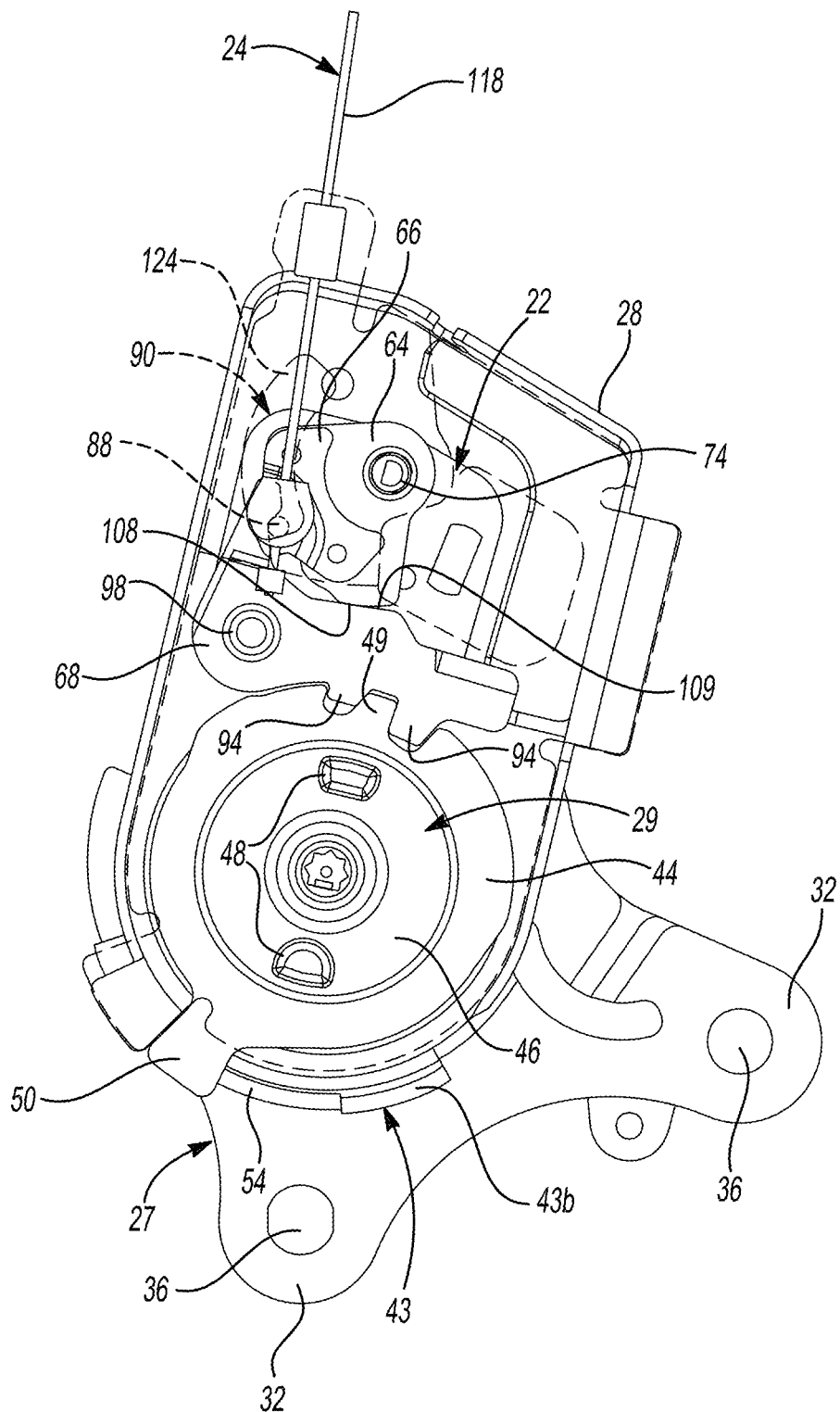
FIG. 12 is a side view of a recliner mechanism and forward-dump mechanism showing a lever of the forward-dump mechanism engaged with a recliner heart of the recliner mechanism.
Figure 13:
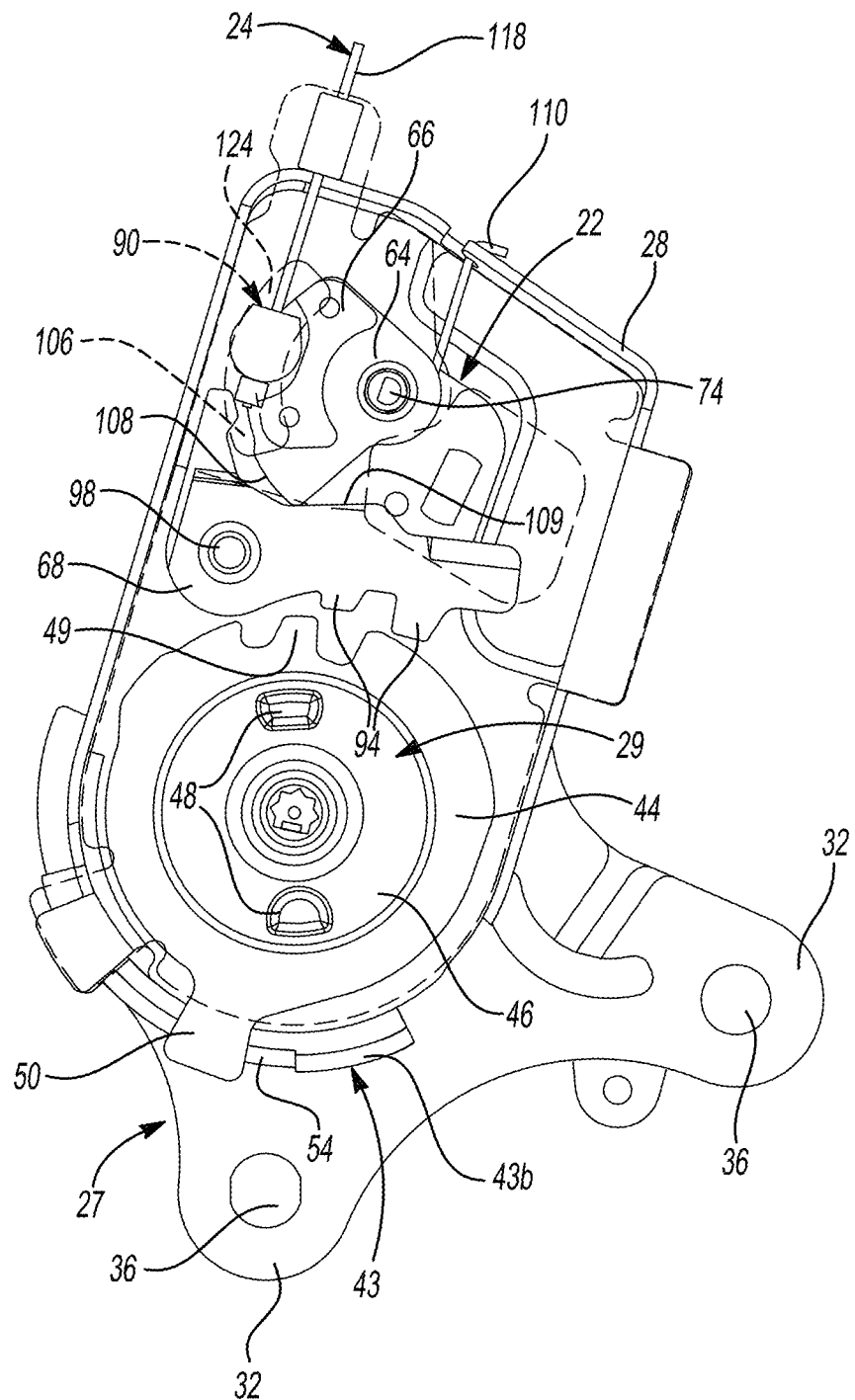
FIG. 13 is a side view of the recliner mechanism and forward-dump mechanism showing the lever of the forward-dump mechanism disengaged from the recliner heart of the recliner mechanism.
Figure 14:
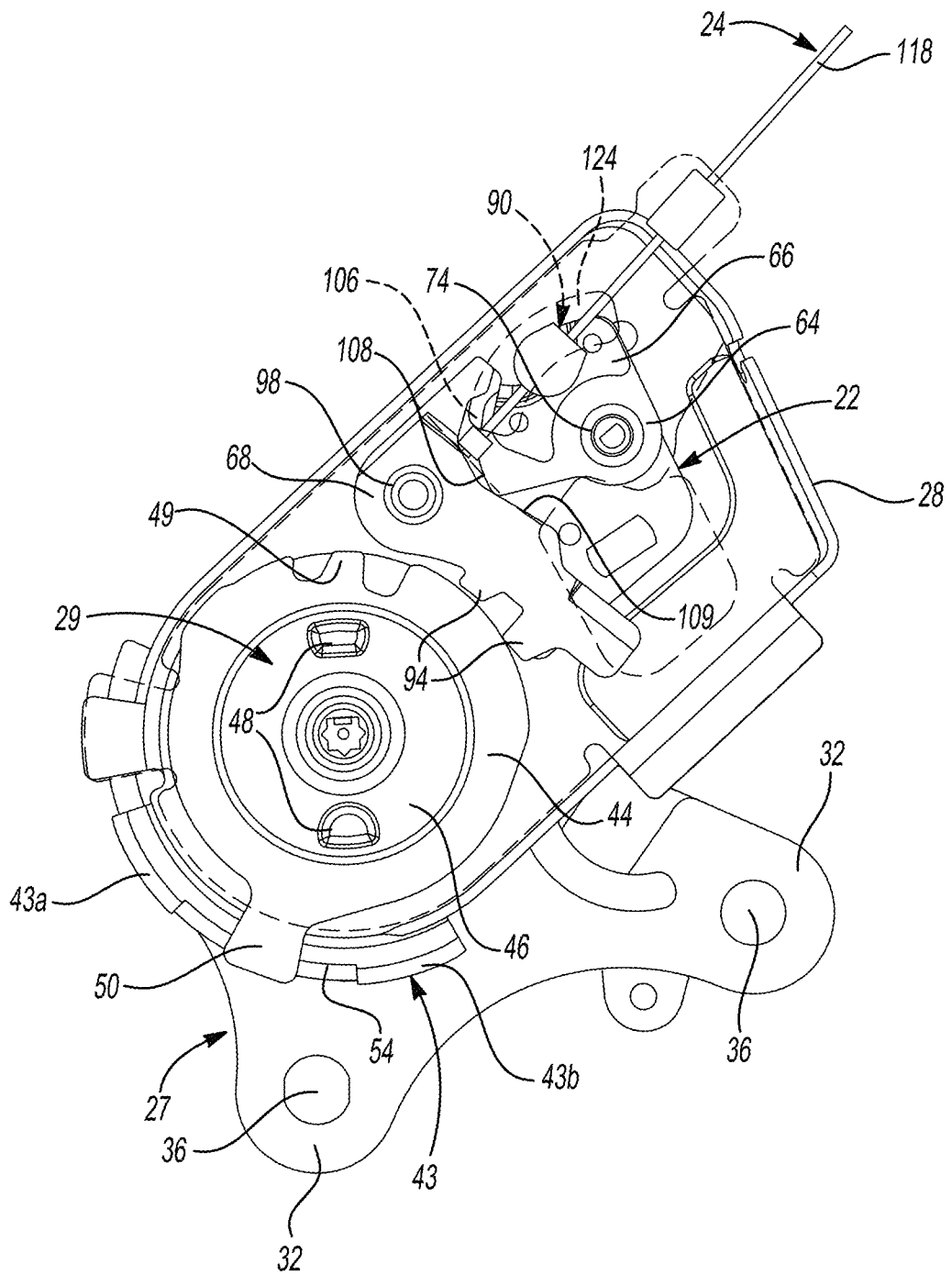
FIG. 14 is a side view of the recliner mechanism and forward-dump mechanism when the seat assembly is in the forward-dump position.

As shown in FIGS. 10 and 11, a stop member 128 may be fixed to an outer surface 130 of the second bracket plate 28 and may contact a lip or edge 132 of the first bracket plate 27 when the seatback 14 is in the forward-dump position FD to limit further rotation of the seatback 14 in the forward-dump position FD. A control switch 134 may be coupled to the mounting plate 69 of the recliner mechanism 20b and may be electrically connected to the motor 63. The control switch 134 may also include a tab 136 that is moveable between a first position (FIG. 16) in which the motor 63 is in an ON mode, and a second position (FIG. 15) in which the motor is in an OFF mode. When the lever 68 rotates from the first state toward the second state, an inclined surface 138 of the lever 68 engages the tab 136 and moves the tab 136 from the first position to the second position, thereby cutting power off to the motor 63. In this way, the user is prevented from operating the motor 63 to adjust the seatback 14 between the rearward-recline position R, the upright position, and the forward-tilt position FT. Although the tab 136 is shown to have a triangular shape, it is understood that the shape of the tab 136 may be circular, square, or any other suitable shape.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seatback adjustment assembly comprising:
   a first bracket plate adapted to be rotationally fixed to a seatback;
   a recliner heart mounted to the first bracket plate and including a first plate and a second plate, the recliner heart operable in an unlocked state in which the second plate is rotatable relative to the first plate and a locked state in which the second plate is fixed relative to the first plate;
   an attachment plate rotationally fixed to the second plate and including first teeth; and
   a lever rotatably coupled to the first bracket plate and including second teeth, the lever rotatable between a first state in which the second teeth are meshingly engaged with the first teeth and a second state in which the second teeth are disengaged from the first teeth,
wherein when the recliner heart is in the unlocked state and the lever is in the first state, rotation of the second plate and the attachment plate causes corresponding rotation of the seatback relative to a seat bottom, and wherein the first bracket plate is configured to rotate to move the seatback relative to the seat bottom without causing corresponding rotation of the second plate and the attachment plate when the lever is in the second state.

2. The seatback adjustment assembly of claim 1, further comprising a cam rotatably coupled to the first bracket plate and including a locking surface, and wherein the cam is rotatable between a first position in which the locking surface engages an outer surface of the lever to prevent the lever from rotating from the first state toward the second state, and a second position in which the locking surface is disengaged from the outer surface of the lever to allow the lever to rotate from the first state toward the second state.

3. The seatback adjustment assembly of claim 2, further comprising a biasing member rotationally biasing the cam toward the first position.

4. The seatback adjustment assembly of claim 2, further comprising an actuation lever mounted on the seatback and operatively connected to the cam such that movement of the actuation lever causes corresponding rotation of the cam into the second position.

5. The seatback adjustment assembly of claim 1, further comprising:
a motor operable between an ON mode in which the motor is allowed to operate the recliner heart and an OFF mode in which the motor is prevented from operating the recliner heart; and
a control switch electrically coupled to the motor and including a tab moveable between a first position in which the motor is in the ON mode and a second position in which the motor is in the OFF mode,
wherein when the lever is in the second state, the lever moves the tab from the first position to the second position.

6. The seatback adjustment assembly of claim 5, wherein the motor and the recliner heart are adjacent to each other, and wherein the control switch is located remotely relative to the recliner heart and motor.

7. The seatback adjustment assembly of claim 1, further comprising:
a cam rotatably coupled to the first bracket plate and including a locking surface;
a connecting member coupled to the cam and including an aperture;
a mounting plate coupled to the first bracket plate and including an arcuate slot;
a pin extending through the aperture and the slot; and
a biasing member biasing the pin toward an end of the slot such that the locking surface of the cam engages an outer surface of the lever to prevent the lever from rotating from the first state toward the second state.

8. The seatback adjustment assembly of claim 7, further comprising:
an actuation lever mounted on the seatback and operably connected to the pin such that movement of the actuation lever causes the pin to traverse the slot and the cam to rotate,
wherein when the pin traverses the slot and the cam rotates, the locking surface of the cam is disengaged from the outer surface of the lever thereby allowing the lever to rotate from the first state toward the second state.

9. The seatback adjustment assembly of claim 8, wherein the actuation lever is connected to the pin via a cable.

10. The seatback adjustment assembly of claim 1, wherein the recliner heart is a round recliner heart, and wherein the first plate is rotationally fixed to the seat bottom.

11. The seatback adjustment assembly of claim 1, further comprising:
a second bracket plate rotationally fixed to the seat bottom; and
a stop member fixed to the second bracket plate and including first and second end portions,
wherein when the recliner heart is in the unlocked state and the lever is in the first state, the attachment plate is configured to contact one of the first and second end portions to limit further rotation of the seatback relative to the seat bottom.

12. The seatback adjustment assembly of claim 1, further comprising:
a second bracket plate rotationally fixed to the seat bottom and including a lip; and
a stop member fixed to the first bracket plate,
wherein when the lever is in the second state, the stop member is configured to contact the lip to limit further rotation of the seatback relative to the seat bottom.

13. A seatback adjustment assembly comprising:
a bracket plate adapted to be rotationally fixed to a seatback;
a recliner heart mounted to the bracket plate and including a first plate and a second plate, the recliner heart operable in an unlocked state in which the second plate is rotatable relative to the first plate and a locked state in which the second plate is fixed relative to the first plate;
an attachment plate rotationally fixed to the second plate and including first teeth;
a lever rotatably coupled to the bracket plate and including second teeth, the lever rotatable between a first state in which the second teeth are meshingly engaged with the first teeth and a second state in which the second teeth are disengaged from the first teeth; and
an actuation lever operatively connected to the lever and moveable between a secure position in which the lever is in the first state and a release position in which the lever is in the second state,
wherein movement of the actuation lever from the secure position to the release position allows rotation of the bracket plate to move the seatback relative to a seat bottom without causing corresponding rotation of the second plate and the attachment plate.

14. The seatback adjustment assembly of claim 13, further comprising a cam rotatably coupled to the bracket plate and including a locking surface, and wherein when the actuation lever is in the first state, the locking surface engages an outer surface of the lever to prevent the lever from rotating from the first state toward the second state.

15. The seatback adjustment assembly of claim 14, further comprising a biasing member rotationally biasing the cam such that the locking surface of the cam engages the outer surface of the lever.

16. The seatback adjustment assembly of claim 15, wherein movement of the actuation lever from the secure position to the release position overcomes a biasing force of the biasing member.

17. The seatback adjustment assembly of claim 13, further comprising:
- a cam rotatably coupled to the bracket plate and including a locking surface;
- a connecting member fixed to the cam and including an aperture;
- a mounting plate coupled to the bracket plate and including an arcuate slot;
- a pin operatively connected to the actuation lever and engaging the arcuate slot and the aperture; and
- a biasing member biasing the pin toward an end of the slot such that the locking surface of the cam engages an outer surface of the lever to prevent the lever from rotating from the first state toward the second state.

18. The seatback adjustment assembly of claim 17, wherein when the actuation lever is moved from the secure position to the release position, the pin traverses the slot and the cam rotates such that the locking surface is disengaged from the outer surface of the lever thereby allowing the lever to rotate from the first state toward the second state.

19. The seatback adjustment assembly of claim 13, further comprising:
- a motor operable between an ON mode in which the motor is allowed to operate the recliner heart and an OFF mode in which the motor is prevented from operating the recliner heart; and
- a control switch electrically coupled to the motor and including a tab moveable between a first position in which the motor is in the ON mode and a second position in which the motor is in the OFF mode, wherein when the lever is in the second state, the lever moves the tab from the first position to the second position.

20. The seatback adjustment assembly of claim 19, wherein the motor and the recliner heart are adjacent to each other, and wherein the control switch is located remotely relative to the recliner heart and the motor.

* * * * *